(12) United States Patent
Ripley et al.

(10) Patent No.: US 9,378,443 B2
(45) Date of Patent: Jun. 28, 2016

(54) CALIBRATION CODED SENSORS AND APPARATUS, SYSTEMS AND METHODS FOR READING SAME

(75) Inventors: Paul M. Ripley, Nanuet, NY (US); Xin Wang, Mechanicville, NY (US); Narasinha Parasnis, Nanuet, NY (US); Swetha Chinnayelka, Tarrytown, NY (US)

(73) Assignee: Ascensia Diabetes Care Holding AG, Basel (CH)

( * ) Notice: Subject to any disclaimer, the term of this patent is extended or adjusted under 35 U.S.C. 154(b) by 852 days.

(21) Appl. No.: 12/779,443

(22) Filed: May 13, 2010

(65) Prior Publication Data

US 2010/0288841 A1    Nov. 18, 2010

Related U.S. Application Data

(60) Provisional application No. 61/178,256, filed on May 14, 2009.

(51) Int. Cl.
| | | |
|---|---|---|
| *G06K 7/12* | (2006.01) | |
| *G06K 19/06* | (2006.01) | |
| *G06K 7/10* | (2006.01) | |

(52) U.S. Cl.
CPC ...... *G06K 19/06009* (2013.01); *G06K 7/10712* (2013.01); *G06K 2019/06225* (2013.01)

(58) Field of Classification Search
USPC .......................................................... 235/469
See application file for complete search history.

(56) References Cited

U.S. PATENT DOCUMENTS

| | | | |
|---|---|---|---|
| 4,473,895 A | 9/1984 | Tatematsu | |
| 5,182,707 A | 1/1993 | Cooper et al. | |
| 5,412,593 A | 5/1995 | Magel et al. | |
| 5,426,289 A | 6/1995 | Kinoshita et al. | |
| 5,508,963 A | 4/1996 | Sawada et al. | |
| 5,572,458 A | 11/1996 | Smith et al. | |
| 5,645,798 A * | 7/1997 | Schreiber ................. | B60L 9/52 |
| | | | 422/410 |

(Continued)

FOREIGN PATENT DOCUMENTS

| | | |
|---|---|---|
| WO | WO 2005/072601 | 8/2005 |
| WO | WO 2006/103083 | 10/2006 |

(Continued)

OTHER PUBLICATIONS

International Search Report and Written Opinion of related International Application No. PCT/US2011/059575 mailed Feb. 10, 2012.

(Continued)

*Primary Examiner* — Michael G Lee
*Assistant Examiner* — David Tardif
(74) *Attorney, Agent, or Firm* — Dugan & Dugan, P.C.

(57) ABSTRACT

In some aspects, a colored coded analyte sensor is provided. The analyte sensor has a body and a plurality of machine-readable colored codes associated with the body. The colored codes may contain red, green, and blue hues, which are discernable into coded information. The coded information may include the analyte sensor model, analyte sensor calibration constant, expiration or manufacture date of the analyte sensor, analyte sensor counterfeiting codes, warnings, messages to the user, etc. Colored code reading systems, apparatus and methods for reading such color-coded information associated with the analyte sensor are provided, as are numerous other aspects.

17 Claims, 10 Drawing Sheets

(56) References Cited

U.S. PATENT DOCUMENTS

| | | | |
|---|---|---|---|
| 5,738,244 | A | 4/1998 | Charlton et al. |
| 5,759,364 | A | 6/1998 | Charlton et al. |
| 5,856,195 | A | 1/1999 | Charlton et al. |
| 6,107,083 | A | 8/2000 | Collins et al. |
| 6,108,250 | A | 8/2000 | Kengeri |
| 6,151,238 | A | 11/2000 | Smit et al. |
| 6,168,957 | B1 | 1/2001 | Matzinger et al. |
| 6,242,790 | B1 | 6/2001 | Tsui et al. |
| 6,246,966 | B1 | 6/2001 | Perry |
| 6,337,507 | B1 | 1/2002 | Bohr et al. |
| 6,531,040 | B2 | 3/2003 | Musho et al. |
| 6,590,797 | B1 | 7/2003 | Nachumovsky et al. |
| 6,841,052 | B2 | 1/2005 | Musho et al. |
| 6,940,751 | B2 | 9/2005 | Peng et al. |
| 6,960,287 | B2 | 11/2005 | Charlton |
| 7,032,823 | B2 | 4/2006 | Nojiri |
| 7,092,273 | B2 | 8/2006 | Look |
| 7,118,668 | B1 | 10/2006 | Edelbrock et al. |
| 7,122,110 | B2 | 10/2006 | Deng et al. |
| 7,125,481 | B2 | 10/2006 | Musho et al. |
| 7,330,802 | B2 | 2/2008 | Hsu |
| 7,402,855 | B2 | 7/2008 | Kurjanowicz |
| 7,458,002 | B2 | 11/2008 | Fischer et al. |
| 7,466,416 | B2 | 12/2008 | Baker et al. |
| 2001/0052646 | A1 | 12/2001 | Effing et al. |
| 2002/0086319 | A1* | 7/2002 | Ellson ................ B01J 19/0046 435/6.11 |
| 2003/0110349 | A1 | 6/2003 | Zimmerman et al. |
| 2004/0179576 | A1 | 9/2004 | Bowden et al. |
| 2005/0007685 | A1 | 1/2005 | Winarski et al. |
| 2005/0041051 | A1 | 2/2005 | de Queiroz et al. |
| 2005/0163657 | A1 | 7/2005 | Childers et al. |
| 2005/0259123 | A1 | 11/2005 | Rice et al. |
| 2005/0285761 | A1 | 12/2005 | Jancke |
| 2006/0039209 | A1 | 2/2006 | Kawasaki et al. |
| 2006/0056246 | A1 | 3/2006 | Doi |
| 2006/0104475 | A1 | 5/2006 | Jancke |
| 2006/0189042 | A1 | 8/2006 | Sakoh et al. |
| 2007/0007621 | A1 | 1/2007 | Omura et al. |
| 2007/0097745 | A1 | 5/2007 | Benjamin |
| 2008/0055959 | A1 | 3/2008 | Luich et al. |
| 2008/0101145 | A1 | 5/2008 | Perry et al. |
| 2008/0304347 | A1 | 12/2008 | Kenkare et al. |
| 2009/0001949 | A1 | 1/2009 | Komori |
| 2009/0068757 | A1* | 3/2009 | Lehmann ............ B01J 19/0046 436/172 |
| 2009/0109725 | A1 | 4/2009 | Schulte et al. |
| 2009/0166418 | A1* | 7/2009 | Onoda ............ G06K 19/06037 235/435 |
| 2010/0007727 | A1 | 1/2010 | Torre-Bueno |
| 2010/0017165 | A1 | 1/2010 | Zhong |
| 2010/0164603 | A1 | 7/2010 | Hafez et al. |
| 2010/0283120 | A1 | 11/2010 | Phillips et al. |
| 2012/0053897 | A1 | 3/2012 | Naffziger |
| 2012/0179614 | A1 | 7/2012 | Tang et al. |
| 2012/0179615 | A1 | 7/2012 | Tang et al. |
| 2013/0291626 | A1 | 11/2013 | Sun et al. |
| 2013/0298648 | A1 | 11/2013 | Sun et al. |

FOREIGN PATENT DOCUMENTS

| | | |
|---|---|---|
| WO | WO 2007/130280 | 11/2007 |
| WO | WO 2009/061568 | 5/2009 |
| WO | WO 2012/064648 | 5/2012 |

OTHER PUBLICATIONS

International Preliminary Report on Patentability and Written Opinion of related International Application No. PCT/US2011/059575 mailed May 23, 2013.

* cited by examiner

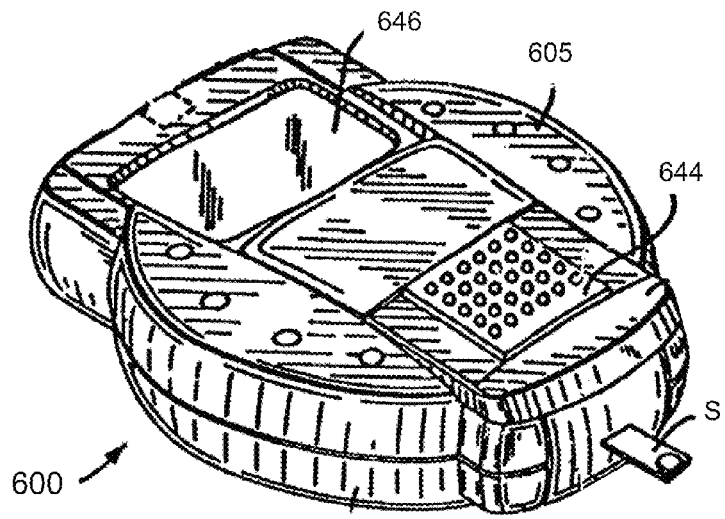
FIG. 6
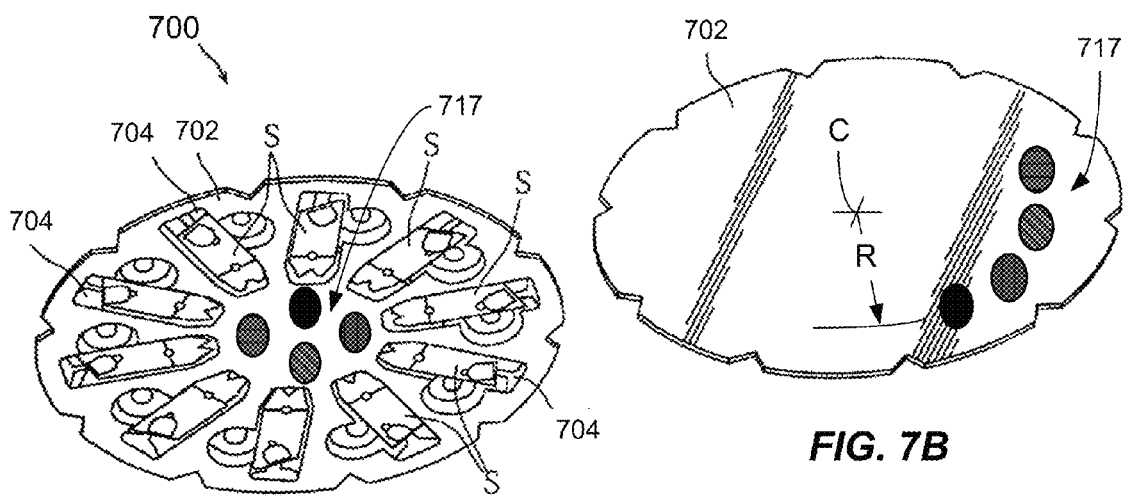
FIG. 7A
FIG. 7B

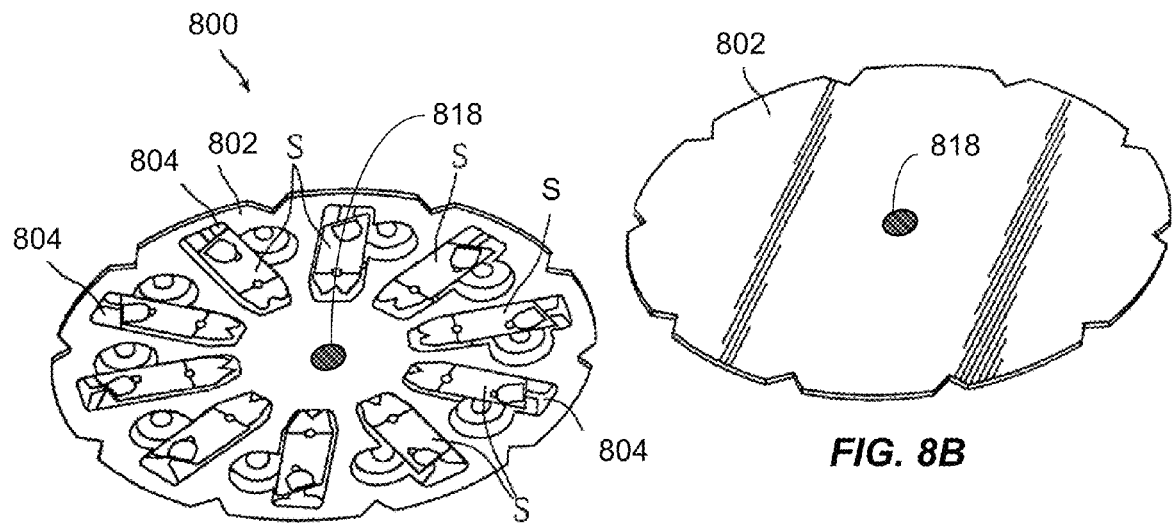
FIG. 8A
FIG. 8B
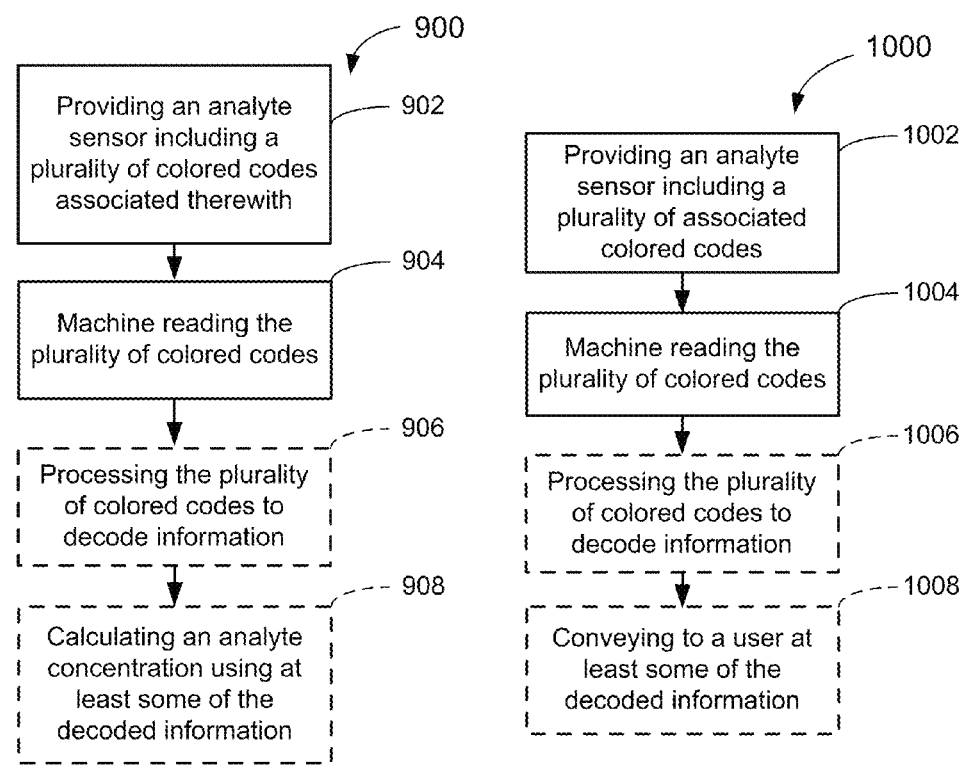
FIG. 9
FIG. 10

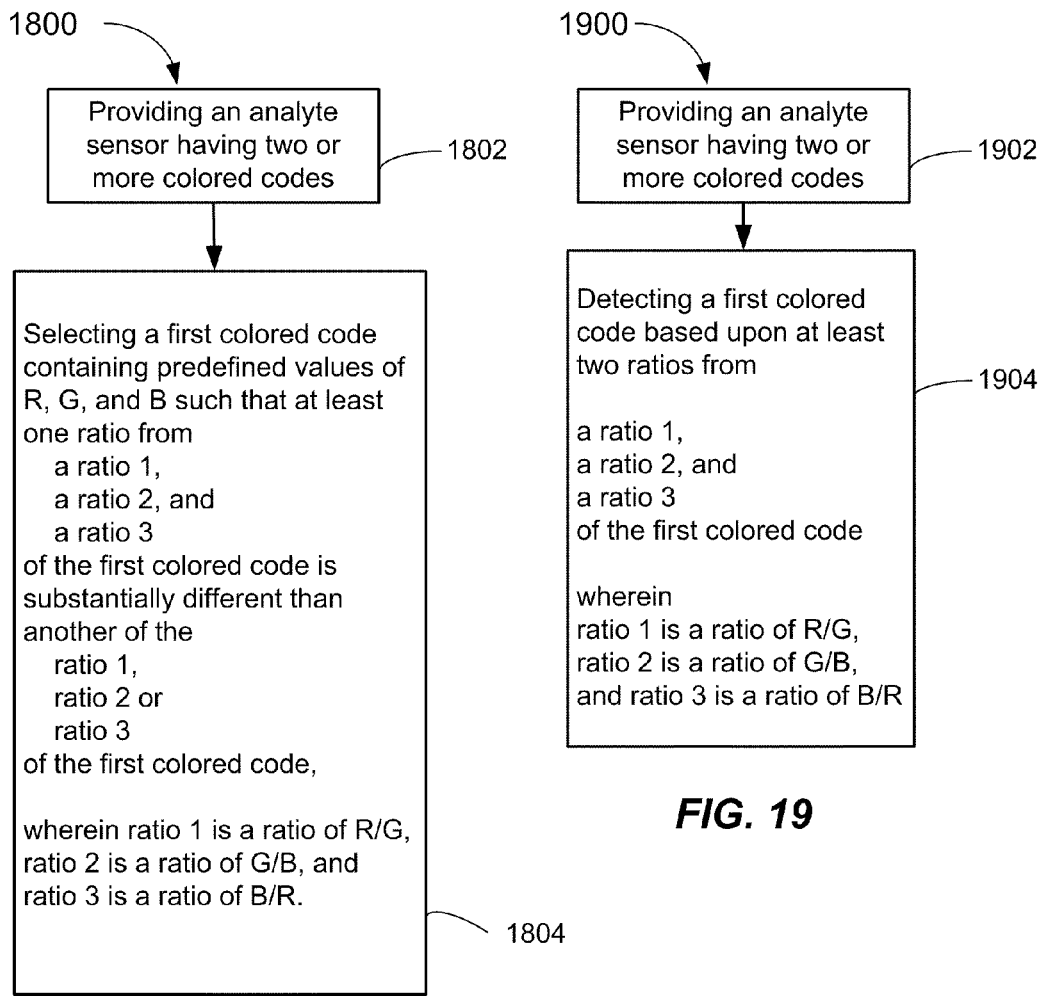

CALIBRATION CODED SENSORS AND APPARATUS, SYSTEMS AND METHODS FOR READING SAME

RELATED APPLICATIONS

The present application claims priority to U.S. Provisional Patent Application No. 61/178,256 filed May 14, 2009, and entitled "CALIBRATION CODED SENSORS AND APPARATUS, SYSTEMS AND METHODS FOR READING SAME" which is hereby incorporated herein by reference in its entirety for all purposes.

FIELD OF THE INVENTION

The present invention relates to analyte sensors including calibration codes, and apparatus, systems and methods for reading such calibration codes.

BACKGROUND OF THE INVENTION

The monitoring of analyte concentration levels in a biofluid (e.g., blood) may be an important part of health management (testing and/or control). For example, analyte sensors (sometimes referred to as "test strips") may be used for the monitoring of a patient's blood glucose level as part of diabetes testing. In analyte testing, for example, the patient may use a portable lancing device which may be a spring-loaded, trigger-releasable device which receives a single-use, disposable lancet. When the lancet is released, it may prick the user's body part to produce a droplet of blood. That blood droplet may then be transferred to an analyte sensor strip which may interface with, and may be received within, a port in an analyte meter, such as a Blood Glucose Meter (BGM). The analyte sensor test strips may also be single use and disposable. Depending on the meter reading, a user may need to undertake control measures, such as by administering a glucose tablet or insulin.

Accurate analyte detection may be important to such control measures. Furthermore, self-coding to enable the analyte meter to read the sensor's calibration information is desirable so that the user may not need to enter any calibration codes or information. The elimination of the need for the manual entry of calibration codes both simplifies the management of the disease for the user, and minimizes a risk of improper manual entry, which may affect the accuracy and precision of the analyte detection.

It would, therefore, be beneficial to provide improved analyte sensors, and apparatus, systems and methods for reading them which exhibit improved accuracy and/or enhanced calibration capability.

SUMMARY OF THE INVENTION

In a first aspect, the present invention provides an analyte sensor including a body of the analyte sensor, and a plurality of machine-readable colored codes associated with the body.

According to another aspect, the present invention provides a code reader apparatus adapted to read coded information associated with an analyte sensor including a light-producing component adapted to provide white light, and a light-receiving component adapted to receive light components reflected from a colored code associated with the analyte sensor and produce signals indicative of light components in the colored code.

In a system aspect, the present invention provides an analyte meter system including a port adapted to receive an analyte sensor, a code reader apparatus adapted to read a colored code associated with the analyte sensor, a light-producing component adapted to provide white light onto the colored code, a light-receiving component adapted to receive light components reflected from the colored code and produce signals indicative of light components in the colored code, and a processor adapted to receive the signals.

In another aspect, the present invention provides an analyte sensor package including a container having one or more pockets, one or more analyte sensors sealed in the one or more pockets, and a machine-readable colored code provided on the container wherein the machine-readable colored code includes a predefined amount of a red hue, a green hue, and a blue hue.

In a method aspect, the present invention provides a method of providing information concerning an analyte sensor including providing an analyte sensor having a plurality of colored codes associated therewith, and machine reading the plurality of colored codes.

Other features and aspects of the present invention will become more fully apparent from the following detailed description, the appended claims and the accompanying drawings.

BRIEF DESCRIPTION OF THE DRAWINGS

FIG. 6 is an analyte meter in which embodiments of the present invention may be used.

FIGS. 7A and 7B are front and back isometric views of an analyte sensor package according to embodiments of the present invention.

FIGS. 8A and 8B are front and back isometric views of another analyte sensor package according to embodiments of the present invention.

FIG. 9 is a flowchart of a method according to embodiments of the present invention.

FIG. 10 is a flowchart of another method according to embodiments of the present invention.

FIG. 18 is a flowchart of a ratiometric selection method according to embodiments of the present invention.

FIG. 19 is a flowchart of a ratiometric detection method according to embodiments of the present invention.

DETAILED DESCRIPTION

Figure 1:
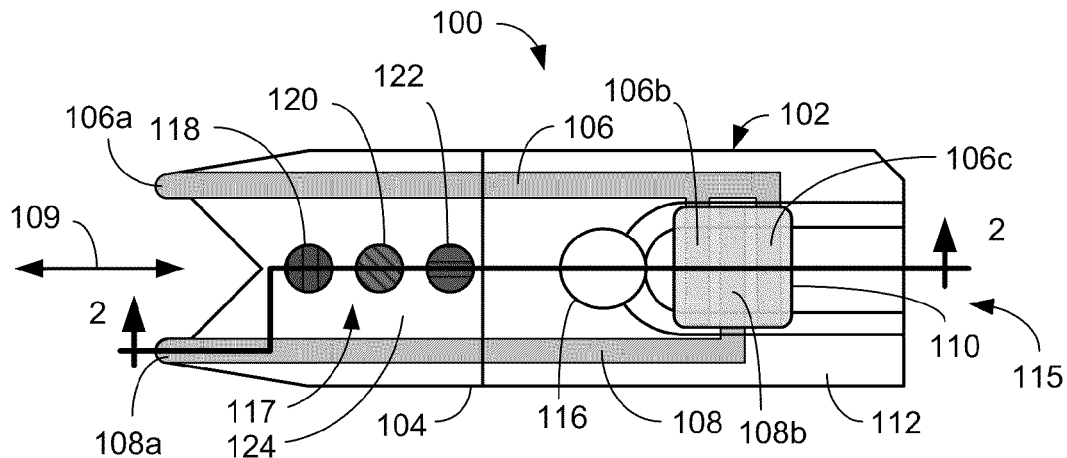
FIG. 1 is a top plan view of an exemplary embodiment of an analyte sensor provided according to the present invention.

The present invention provides an analyte sensor according to some aspects. An exemplary analyte sensor (hereinafter otherwise referred to as an "analyte sensor" or simply a "sensor") may include a body, and a plurality of machine-readable colored codes associated with the analyte sensor. The colored codes may be associated with the body such as by being provided on the body or optionally on the packaging thereof (e.g., by printing or adhering a label). One or more analyte sensors may be contained in the packaging. The plurality of colored codes may provide a high density of detailed calibration information about the analyte sensor to an analyte meter (e.g., a BGM) adapted to communicate with the analyte sensor. The number of plurality of machine-readable colored codes may include two or more, or even three or more. Each of the plurality of machine-readable colored codes may include a predefined amount of colored hues of a plurality of colors (e.g., Red (R), Green (G), and Blue (B)).

In some embodiments, the analyte sensor may include a body and a machine-readable colored code associated with the body which may include a predefined amount of a red (R) hue, a green (G) hue, and a blue (B) hue. These hues may be resolvable into integers adapted to represent coded information. Thus, for each colored code including three hues, for example, three integer pieces of information are discernable. Thus, in some embodiments, using a single colored code may allow the coding of integers between 0 and 999, for example. As should be recognized, using only a small number of colored codes may allow the coding of a vast amount of information on the analyte sensor or packaging. In addition to calibration constants for the analyte meter, other forms of information may be associated with the analyte sensor and decoded by the analyte meter.

In yet another aspect, the present invention provides a colored code reader apparatus and system. The apparatus and system is adapted to read one or more colored codes. According to some embodiments, the colored code associated with an analyte sensor may be illuminated with a light (e.g., a white light or RGB light source) from a light-producing component. A light-receiving component adapted to receive light components reflected from the colored code may produce signals indicative of light components of the colored code. A suitable processor, such as provided in, or coupled to, an analyte meter, may be adapted to receive the signal indicative of light components. The information concerning the light components may be processed and decoded to generate a calibration constant, for example, such as by correlating with ranges of color values of a look-up table stored in memory. In some embodiments, the coded information may be adapted to convey other information to a user (e.g., instructional, inspirational, reward, etc.). Further, the coded information may be used by the analyte meter for internal calculations.

Coded information which may be provided by the colored codes may be indicative of at least two pieces of information selected from a group consisting of analyte sensor model, analyte sensor calibration information, analyte sensor manufacturing facility, analyte sensor sales territory, analyte sensor expiration date, analyte sensor manufacture date, prize winner information, inspirational information, instructional information, analyte sensor anti-counterfeiting information, analyte sensor temperature dependent calibration codes, analyte meter model, and a unique analyte sensor lot identifying number. Temperature dependent calibration codes may be used by analyte sensors that include active regions that may be affected by temperature variations. Analyte meter model coding may be adapted to check backwards compatibility with the analyte meter receiving the analyte sensor. The unique analyte sensor lot identifying number may assist the analyte meter in recording the number of tests performed from different lots. The unique analyte sensor lot identifying number can be used for uploading along with the analyte meter data to a software package for further analysis. This lot number information may be used by customer support for assisting the diagnosis of user or meter errors, and by marketing to study the testing habits of customers.

In a further aspect, the present invention is directed at a method of providing information to an analyte meter. The method includes providing an analyte sensor including a plurality of colored codes associated therewith, and then machine reading the plurality of colored codes. Thereafter, the coded information in the colored codes may be deciphered (decoded) and used in calculations carried out by the analyte meter, or used to display or convey useful information to the user.

These and other embodiments of the analyte sensor, and systems and methods for reading the coded information on the analyte sensor of the present invention are described below with reference to FIGS. 1-19.

Figure 2:
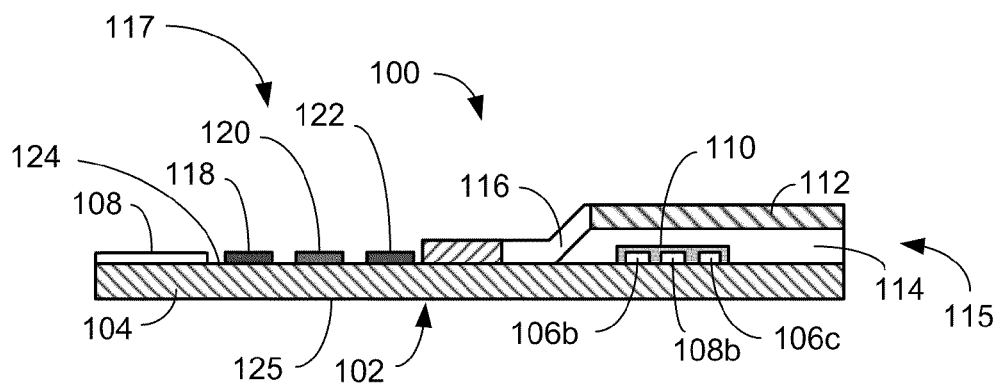
FIG. 2 is a cross-sectional side view of the analyte sensor of FIG. 1 taken along section line 2-2.

FIGS. 1-2 illustrate a first exemplary embodiment of an analyte sensor 100 provided according to the present invention. The analyte sensor 100 may include a body 102 including a base 104 onto which other components of the analyte sensor may be provided. The base 104 may be manufactured from any suitable insulating material, such as a polymer material, for example. Suitable polymer materials for the base 104 may include polycarbonate, polyethylene, dimensionally stable vinyl and acryl polymers, as well as polymer blends such as a polycarbonate and polyethylenentherephthalate blend. Other polymer materials may be used.

Applied to, or otherwise mounted on, the base 104 may be a first electrode 106 and a second electrode 108. The electrodes 106, 108 may be applied by a screen printing technique or other suitable technique wherein a conductive material such as an electrode ink including electrochemically-active carbon and silver may be applied to form an electrode pattern extending along a longitudinal length of the base 104. Laser ablation may also be used to create an electrode pattern upon a sensor substrate. In this case, a conductive material such as gold, silver, or palladium is sputter coated onto the base 104 typically through an evaporative process. A mask that defines the sensor electrode pattern is placed in contact with the sputter-coated surface. The mask substrate can be made from quartz with chromium typically being used to define the geometry and pattern of the desired electrodes. Once the mask is in place over the coated surface, a high intensity laser is directed onto the mask. The conductive material that is exposed to the high energy radiation from the laser is ablated leaving an exposed uncoated base 104. The conductive coating that has been protected by the mask is left unaffected. Thus, the ablation process may define the configuration of the electrode pattern. Other methods for forming the electrodes may be used.

Figure 5:
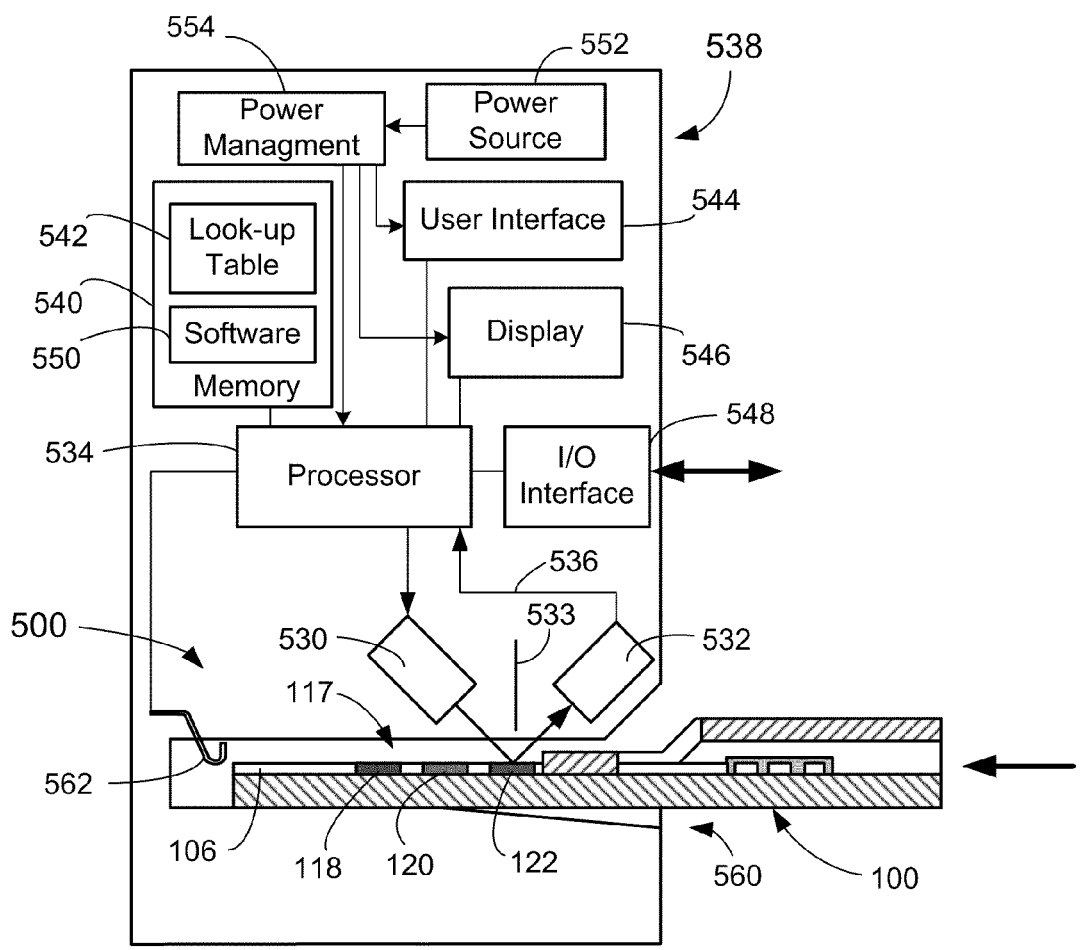
FIG. 5 is a schematic view of a system adapted to read calibration information according to the present invention.

The electrodes 106, 108 may include first exposed ends 106a, 108a which are adapted to connect with electrical contacts of an analyte meter (e.g., a BGM as depicted in FIG. 5) so that the analyte sensor 100 may communicate information to the meter (such as an electrical signal). Other types of analyte meters may be used. On the other end of the electrodes 106, 108, an electrode pattern may be provided wherein the electrodes extend in close proximity to each other and may form at least one gap, or even a plurality of gaps, between the electrodes 106, 108.

In the depicted embodiment, the pattern of the first electrode 106 includes first electrode member 106b and a second electrode member 106c formed on a second end of the first electrode 106. The electrode members 106b, 106c may extend across a width of the base 104, for example. The second electrode 108 may include a single electrode member 108b formed on its second end. The single electrode member 108b may be received and interleaved between the first and second electrode members 106b, 106c thereby forming multiple gaps. The electrode patterns 106, 108, as applied, may be about 14 microns (about 0.00055 inch) thick. Other thickness may be used. Furthermore, other thin conductive materials may be used for the electrodes, such as electrically-conductive metal films or strips. Moreover, other patterns for the two electrodes may be utilized such as shown in U.S. Pat. Nos. 6,841,052; 6,531,040; 7,122,110; 7,118,668; and 7,125,481. Additional electrodes may be provided for under fill detection, as is known in the art.

Over a top of the electrode members 106b, 106c and 108b, an active region 110 may be applied. The active region 110 functions to convert an analyte (e.g., glucose) contained in the bio-fluid sample being analyzed (measured) stoichiometrically into a chemical species measurable in terms of the electrical current generated, or otherwise generate an electrical current generally proportional to an amount of the analyte present. The electrical current may be conducted by the electrodes 106, 108 and read by a suitable analyte meter. Such analyte meters are known in the art. Prior to applying the active region 110, a dielectric layer (not shown) may be provided overtop of the electrodes 106, 108 in regions where it is not desired for the active region 110 to be applied. In essence, this dielectric layer application functions as a mask to confine the active region 110 to a precisely defined region (area) proximate to the gaps formed between the electrode members 106b and 108b, and 106c and 108b, respectively. The dielectric layer may include a UV-cured polymer, such as an acrylate modified polyurethane material and may have a thickness of about 10 microns (0.0004 inch), for example. Other thicknesses and/or types of insulating materials may be used. The insulating layer may be applied broadly enough so that it covers relatively large areas around the active region 110.

A lid 112 may be provided overtop of the base 104. The lid 112 may be fused or otherwise adhered to the base 104 by application of heat and pressure, for example. Other means of fastening the lid 112 may be employed, such as by the use of an adhesive. The lid 112 may be formed, such as by stamping or heat forming, to have a concave space 114 which may extend from an end 115 of the analyte sensor 100 towards the location of the active region 110. The concave space 114 may provide a capillary channel into which a bio-fluid may pass. The lid 112 may be manufactured from a deformable polymer material, such as polycarbonate, an embossable grade of polyethylenetherephthalate, or a glycol modified polyethylenetherephthalate, for example. Other types of materials may be used, as well. A polyurethane dielectric material may be applied over an area encompassed by the lid 112 and may aid in sealing the lid 112 to the base 104. Further details of the structure of the lid 112 and base 104, as well as attachment details are provided in U.S. Pat. No. 5,759,364.

A vent 116 in the form of a hole or perforation may be provided at an end of the concave space 114 to improve capillary action and flow of the bio-fluid into the concave space 114 from the end 115 when applied there by the user.

Associated with the analyte sensor 100, such as being provided on or applied to the body 102 of the analyte sensor 100, are a plurality of colored codes 117. The colored codes 117 are adapted to be machine-readable. The number of colored codes 117 may number two or more, three or more, four or more, etc. The larger the number of codes provided, the larger the amount of coded information which may be provided on the body 102. The coded information may concern or be related to the features/properties of the analyte sensor 100 and/or to information that is to be relayed to, or displayed to, the user. For example, FIGS. 1 and 2 depict three colored codes 118, 120, 122 provided on the body 102. The plurality of colored codes 117 may be provided as dots (e.g., round dots). Other shapes may be provided such as squares, rectangles, lines, etc. The colored codes 117 may be configured and arranged in spaced increments along a longitudinal length of the body 102, as shown by arrow 109 in FIG. 1. In some embodiments, the spaced intervals may be equal (e.g., evenly spaced intervals). Further, the colored codes 117 may be centered on a width of the body 102 of the analyte sensor 100, for example. The codes 117 should be spaced sufficiently apart so that a colored code reader apparatus 500 shown in FIG. 5 may read each of the colored codes (e.g., 118, 120, 122) as the sensor 100 is inserted into a port 560 (FIG. 5) of the colored code reader apparatus 500.

Figure 3:
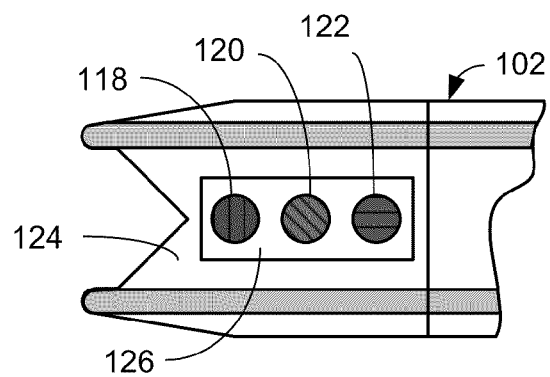
FIG. 3 is a partial top plan view of another exemplary embodiment of an analyte sensor provided according to the present invention.

The one or more colored codes 117 may be provided on a top planar surface 124 or the bottom surface 125 of the base 104, but may be preferably positioned on the end of the body 102, which is closest to the first ends 106a, 108a of the electrodes 106, 108. However, optionally, the colored codes 117 may be provided on the lid 112. The colored codes 117 may be printed, marked or painted, such as by an inkjet, color laser, lithography, electrographic printing, or a screen printing onto the body 102 (such as on a top surface 124 of the base 104 as shown). The colored codes 117 may be placed in any suitable position on or associated with the body 102 such that they may be read by the colored code reader apparatus 500. Optionally, the colored codes 117 may be printed onto a label 126 which may be affixed (e.g., such as by adhering) to the body 102, such as to the top surface 124 of the base 104 as shown in FIG. 3. The label 126 may include a self-adhesive backing to secure the label 126 to the body 102. However, any suitable adhesive or other attachment method may be used. The colored codes 117 may be provided on a single label or a plurality of labels. As mentioned above, the one or more colored codes may be provided on the packaging, such as when a package/cartridge of the analyte sensors is received into the analyte meter.

According to some embodiments, each of the colored codes 117 applied to the body 102 may have an individual preselected and predetermined color. The colors may be produced by printing methods that employ a (Cyan-Magenta-Yellow-Key [Black]) CMYK system to enable the rendered colors to closely match those that are read by the (Red, Green, Blue) RGB system. The RGB system uses an additive color model, compared to how colors are printed with the CMYK system, which is a subtractive color model. The advent of digital photography and printing has provided the analytical tools to ensure that color printed reproductions created with inks closely match the reflected colors that are detected by the photodiodes in an RGB sensor, for example. Each one of the colored codes 117 may be made up of multiple color components. For example, each of the colored codes 117 may have a predefined amount of hue of three or more colors. The predefined hues may include three or more colors, such as red (R), green (G), and blue (B), for example. In some embodiments, each of the colors making up each of the colored codes 117 may have a measured hue amount ranging from a numerical value of about zero to a numerical value of about 255. For example, each one of the colored codes 117 may have a predefined hue of red, green, and blue, each ranging from a numerical value of about 0 to a numerical value of about 255. Of course, signal processing may change the output amplitude.

For example, a first colored code 118 may have a hue of 255 for red, and a hue of zero for both green and blue, for example. Similarly, a second colored code 120 may have a hue of zero for red, a hue of 255 for green, and a hue of zero for blue. Likewise, a third code 122 may include a hue of zero for red, a hue of zero for green, and a hue of 255 for blue.

In further embodiments, more colors may be used. For example, each of the colored codes 117 may be orange, purple, for example, and various shades and combinations of colors may be used. However, in each case, the colors of an individual code (e.g., 118) may be discernable into three numerical readings, a first numerical reading indicative of a hue of red (R), a second numerical reading for a hue of green (G) and third numerical reading for a hue of blue (B). For example, one shade of a pink color may read as [255, 105, 180], for example, where the first numerical reading in the bracket corresponds to the red hue (R), the second numerical reading in the bracket corresponds to the green hue (G), and the third numerical reading in the bracket corresponds to the blue hue (B). Thus, the numbers correspond to, and may be expressed as, [R, G, B] wherein R=red, G=green, and B=blue. Accordingly, for each individual one of the pluralities of colored codes 117, three pieces of predetermined numerical information may be encoded on, or associated with, the analyte sensor 100. This coded information provided by the plurality of colored codes 117 may later be read by a colored code reader apparatus and extracted for utilization by, or display by, an analyte meter.

Large amounts of coded information may be provided concerning the analyte sensor 100 with a relatively small number of colored codes 117. For example, by using a single color code with just 10 different hues over the range of 0 to 255, this would create 10×10×10 [R,G,B]=$10^3$ different colors or pieces of information. The use of two colored codes would result in $10^3 \times 10^3 = 10^6$ pieces of information that may be coded. By using three colored codes, $10^9$ may be possible. Furthermore, if the number of the hues is increased from say 10 to 15, then more pieces of information may be coded. Accordingly, mechanisms for increasing the number of hues that may be accurately discerned are desirable, and a method for improving such accuracy is described below herein. This coded information may be read by a colored code reader apparatus, and may be related or correlated to a look-up table, otherwise stored in memory, or processed and displayed to the user. In some embodiments, calibration information, such as a calibration constant, may be extracted from one or more of the colored codes 117 and used by an analyte meter to affect a proper calibration thereof.

In order that the hues of red, green and blue may be easily detectible, it may be desirable to use only hues separated by a predetermined amount. In other words, various shades of the RGB hues may be provided which are spaced apart from one another by a sufficient hue margin. For example, 25 or less hues over the range of 0 to 255 may be used, or even 15, or even 10 or less. The hues for each color used in the colored codes 117 may be appropriately spaced so that each hue (and associated numbers) may be readily detected. This may also limit a size of the look-up table(s) needed. This spacing of the hues may offset the effects of aging in the printed color codes, and may offset for any degradation of the electronic components such as the RGB sensor with time. This spacing would also minimize the possibility of miss-reading hues that are very close together in the color space.

In practical application, when an analyte sensor 100 is manufactured, normal manufacturing variations result in differences in the properties of the analyte sensors 100 between lots, and even between batches within lots. Thus, for each batch and/or lot of the analyte sensors produced there may be a separate calibration constant that may be determined and assigned that will allow an analyte meter (e.g., a blood glucose meter) to adjust its internal analyte value calculation so that an accurate analyte reading is achieved and conveyed to the user. Such calibration codes 117 (otherwise referred to herein as calibration constants) may be generated for each batch and/or lot and colored codes 117 coding such calibration constants may be associated with each analyte sensor 100. Such association may be by immediately printing or otherwise affixing on the body 102 of the analyte sensor 100 (or the packaging) for each lot and/or batch the colored codes 117. This color-coded information may later be extracted by an analyte meter to determine a calibration constant to be applied in the analyte calculation carried out by the analyte meter.

Although embodiments of electrochemical analyte sensors have been described herein, it should be recognized that the plurality of colored codes 117 may be applied to, and associated with, any type of analyte sensor, such as a photochromic analyte sensor whereby a change of color of a photochromic material onto which the bio-fluid is applied is measured to detect an analyte concentration level. Likewise, although one application for the analyte sensor of the present invention is for glucose detection, the present invention may be used for analyte sensors for measuring any other type of analyte. For example, the colored codes may be associated with analyte sensors for testing levels of lactate, keytones, total cholesterol, uric acid, lipids, triglycerides, high density lipoprotein (HDL), low density lipoprotein (LDL), Hemoglobin A1c, etc. Immuno-assays, such as a BAYER HEALTHCARE A1cNow+ meter may perform a Glycated Hemoglobin A1c test.

In one exemplary embodiment, a first colored code 118 may include up to 999 pieces of information if each of the RGB readings ranges from a numerical value of between 0-9. For example, a red hue reading between 0-25 may equal a numerical integer 0, a red hue reading of 25-51 may equal a numerical integer 1, a red hue reading of 51-77 may equal a numerical integer 2, . . . , and a red hue reading of 230-255 may equal a numerical integer 9. Again, the actual value output may be scaled up or down based upon the electrical conditioning provided such as filtering, amplification, etc. However, 1-255 definable increments may be available from the sensor's (e.g., photodiode) output. Similar numerical readings may be assigned for the green and blue hues. Accordingly, a number between 1 and 999 may be generated off from reading the respective hues in a single colored code (e.g. 118) having RGB hues. Thus, a calibration constant of 500 may be a nominal value, and adjustments in the constant of +/−499 points from the nominal may be provided. Of course, a lesser number of integers may be used if less accuracy is acceptable, such as 50+/−49 points, or 5+/−4 points.

Similarly, another of the colored codes 117 (e.g., the second colored code 120) may be used to designate a date of manufacture, or a date of expiration, of the particular batch or lot of the analyte sensors 100. For example, the red hue may equate to a particular week of the month (e.g., between 1 and 5), the green hue may equate to a particular month of the year (e.g., between 1 to 12), and the blue hue may equate to a particular year over a ten year period (e.g., 2009 to 2019), for example. Thus, [R,G,B] numerical hues of [75, 141, 37] for a single colored coded (e.g., the second colored code 120) could stand for second week of June, 2010, for example. In some embodiments, if the resolution of the increments of hue that may be discerned accurately were improved, then even for information could be discerned from each colored code.

Another of the colored codes 117 (e.g., a third colored code 122) may be used to code additional information such as manufacturing location. For example, a number between 1 and 10 may be equated to each of ten ranges of hues of red, and each facility may be assigned a number from 1 to ten. Optionally or additionally, sales territories into which the analyte sensors 100 are intended to be sold may be coded. A sales territory code, which may be assigned a number from 1 to ten, may be coded as a green hue, for example, in the third colored code 122. The third code 122 may also be used for coding a so-called "golden strip," which if received by the user, may be rewarded with a prize. For example, if the coded information of the third colored code 122 were to equal a predetermined number stored in memory or in a look-up table upon insertion in an analyte meter, then the user may be rewarded with a free package of sensors or another prize (such as a diabetes supply organizer).

Furthermore, an anti-counterfeiting code may be included in one or more of the colored codes 117. For example, a certain hue of green and/or blue may be used for a certain manufacturing facility but only for certain months of the year. This code would be preprogrammed into the analyte meter, and if the analyte sensor read by the analyte meter did not include the proper code, the analyte meter would designate a warning or error (displaying "counterfeit strip") and may instruct the user to return the strip to the manufacturer of the meter for a free replacement, for example. The analyte meter may still allow a reading to be displayed, but still display a warning that the reading may be suspect. In this way, the manufacturer of the analyte sensor 100 may be readily placed on notice of potential counterfeiting activity such that corrective measures may be promptly undertaken.

Furthermore, the colored codes 117 may be employed for ensuring that the correct units of measure are displayed (e.g., molarity as expressed by mM/dL, or mass concentration as expressed by mg/dL, or English or metric units) by the analyte meter. For example, one colored hue of one of the colored codes 117 may be used to distinguish and prompt the analyte meter to use the correct units. Likewise, a particular analyte meter may be able to receive multiple types (models) of analyte sensors by reading coded information in the colored codes 117, which correspond to the analyte sensor model, and then equating the analyte sensor model to a different look-up table in the analyte meter for that model. Thus, an analyte meter may accept older versions of the analyte sensors, for example, and may be able to readily recognize the analyte sensor and adjust accordingly.

In some embodiments, inspirational messages may be equated to a particular hue of one of the colored codes 117 and be displayed on a display of an analyte meter. For example, a saying such as "you are taking good care of yourself" or "keep up the good work" may be displayed. Further yet, instructional information may be provided by the colored codes 117 and displayed or otherwise conveyed to the user when a particular hue of color of a code is read by the analyte meter. All of this useful information may be communicated between the analyte sensor and the analyte meter with only a small number of colored codes, such as two or more, three or more, or four or more, etc. Communication may be via a visual display or an audible (e.g., voice) means.

Figure 4:
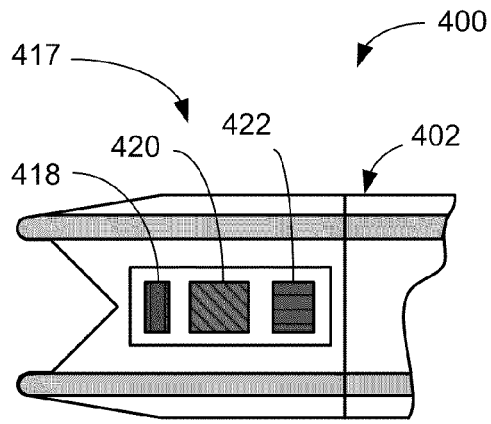
FIG. 4 is a partial top plan view of another exemplary embodiment of an analyte sensor provided according to the present invention.

As shown in FIG. 4, additional coded information may be included in the colored codes 417 by additionally including relative width information. The relative width information of each of the colored codes 417 equates to a relative (normalized) time duration when read by an analyte meter. For example, a normalized width of the three codes 418, 420, 422 may be provided and correspond with a duration reading of between 1 and 10, for example. The duration reading is the time during which a reading may be received for each of the colored codes. A short duration may equate to a zero and a longest duration equating to a nine, for example. Accordingly, in addition to the RGB information available from each of the colored codes 418, 420, 422, an additional piece of information may be provided from the analyte sensor 400, i.e., width or duration. Thus, according to this aspect, an additional digit of coded information may be provided for each of the colored codes 417. Of course, the user may need to be instructed to carefully insert the analyte sensor 400 at a relatively constant rate of advancement into the analyte meter, or an advancing device (e.g., built into the analyte meter) may advance the analyte sensor 400 past a code reader system at a relatively constant rate. For example, a motor-driven contact wheel or mechanism (not shown) may contact the analyte sensor 400 as it is first inserted into the analyte meter and may draw the analyte sensor including the colored codes 417 into the analyte meter at a substantially constant rate, for example.

In accordance with another aspect of the invention, a colored code reader apparatus may be provided. The colored code reader apparatus 500, as best shown in FIG. 5, includes a light-producing component 530, a light-receiving component 532, and a processor 534. The light-producing component 530 may be adapted to provide a white light beam to illuminate one or more of the respective colored codes 117 as they pass in front of the light-producing component 530. The light-receiving component 532 receives the light reflected from the respective colored codes 117 as they pass by the light producing-component 530 and may produce electrical signals in a signal conductor 536. The signals are sent to the processor 534, which is adapted to receive the signals and process the same. The light-producing component 530 and the light-receiving component 532 may be provided at an angle of about 45 degrees to a plane of the colored code, for example. Theoretically, any angle larger than 0 degree and smaller than 90 degree may be used. However, the most suitable angle to use will be determined based upon a compromise between the read efficiency and the actual mechanical design of the system. Regardless of the angle selected, the opto-mechanical design should reduce or minimize the incidence of direct specular reflections from the white LED onto the RGB sensor. These reflections contain no color information and may add unwanted noise to the color reader system. A light shield 533, such as a wall or any other type light blocking component, may be provided between the light producing component 530 and the light receiving component to minimize the direct specular reflections.

The signals may be indicative of the color components present in each of the colored codes 117. For example, as the first colored code 118 passes by the light-producing component 530, the reflected color components [R,G,B] are received by the light-receiving component 532 and signals indicative of the light components (e.g., hues of each of R, G, and B) in the colored code 118 may be provided to the processor 534. The signals may include the [R,G,B] hue components and may be provided on separate channels of the light-receiving component 532.

The light-producing component 530 may be any suitable white light producing device, for example. In particular, the light-producing component 530 may be a white-light Emitting Diode (LED). Suitable white LEDs include white LEDs Model SMLP12WB from Rohm, Model SSG:LNJ02626X8BRA available from Panasonic, and Model GM5BW05340AC available from Sharp Electronics, for example. The light-receiving component 532 may be any suitable RGB color sensor. For example, the RBG color sensor may be a three-channel RGB photodiode sensitive to Red ($\lambda$=620 nm), Green ($\lambda$=540 nm), and Blue ($\lambda$=460 nm), for example. Optionally, the RGB color sensor may be a RGB filtered photodiode. Thus, the light-receiving component 532 may include an electrical connection for each of the colors [R,G,B], which may provide the signals indicative of the hue amounts of each color in the colored code 118 to the processor 534. Suitable RGB sensors include Model S9032-02 from Hamamatsu Photonics of Hamamatsu City, Japan, Model MTCS1CS from MAZeT GmbH of Jena, Germany, and Model TCS230 from Texas Advances Optoelectronic Solutions of Plano, Tex., for example.

The processor 534 may be any suitable processor. For example, the processor 534 may be any device or collection of devices that are capable of receiving the signals and executing any number of programmed instructions, and may be a microcontroller, microprocessor, digital signal processor, or the like. Data processed by the processor 534 including the signals from the colored code reader apparatus 500 and from the analyte sensor 100 may be stored in a memory element 540, which may include a look-up table 542. The processor 534 should be capable of performing simple error checking on the detected optical signal. For example, when an analyte sensor 100 is inserted, the light-receiving component 532 may detect the reflected color codes as a function of time as the analyte sensor 100 is inserted into the code reader apparatus 500. Consequently, a simple error checking procedure may include inspecting the detected signal and determining if the appropriate number of color codes 117 has been detected. For example, if an analyte sensor 100 employs three color codes 117, were the three signals detected those that correspond to the reading of the three color codes 117. In some embodiments, the signal detection may not be used to indicate an error, but may be used to facilitate backward compatibility. For example, this may allow the use of an older generation of analyte meter including the code reader apparatus 500 with a newer analyte sensor 100. The error checking procedure may also inspect the characteristics of the signal. This could determine if the detected RGB signal in signal line 536 exceeds a pre-determined threshold indicative of genuine analyte sensor 100 being inserted into the code reader apparatus 500.

Other processing steps could include cross-checking procedures. For example, after a valid signal has been detected and checked for errors, a cross checking procedure may perform a validation of the measured RGB color codes 117 in order to determine if they agree with a pre-determined range set within the code reader apparatus 500. This may be used to check if the RGB sensor and the white LED of the code reader apparatus 500 are performing appropriately have not been degraded through wear and tear or abuse. If these color codes 117 are valid then the processor 534 may proceed with locating their corresponding information that may be stored in a look-up table 542.

In some embodiments, the colored code reader apparatus 500 may be included within an analyte meter system 538. The analyte meter system 538 may have a user interface 544, which may include a display 546, which, for example, may be a liquid-crystal display or the like. Push buttons, a scroll wheel, touch screens, or any combination thereof, may also be provided as a part of the user interface 544 to allow a user to interact with the analyte meter system 538. The display 546 typically may show information regarding the analyte test results, the testing procedure, the analyte sensor, and/or information in response to signals input by the user, but may also include information (e.g., warnings, inspirational and/or instructional messages) conveyed to the user as previously described herein.

The processor 534 may centrally manage communications with the other system components, such as the user interface 544, display 546, code reader apparatus 500, and I/O interface 548. The processor 534 may also execute instructions and sequences in software 550 stored in memory 540 that may handle the processing of the test data from the analyte sensor 100, as well as processing and decoding signals received from the colored code reader apparatus 500.

The analyte meter system 538 may include a suitable power source 552, such as a battery or other power component. Power management 554 may distribute power from a power source 552 to the processor 534 as well as to other system components that do not have their own power source. The power management 554, for example, may be configured to enter a standby mode to minimize power use when the system is idle. Additionally, if a rechargeable battery is employed, the power management 554 may also handle the recharging of the power source 552.

Although the analyte meter 538 may store test results and provide a user interface 544 to display test results, software operating within the processor 534 may provide for communication with other devices. This may provide for more advanced functionality for managing, processing, and displaying test results. For example, the test-related data collected by the analyte meter system 538 may be downloaded to another device to allow further processing and more sophisticated display and analysis of the data. For example, the data may be downloaded and further processed in a product such as WINGLUCOFACTS® Diabetes Management Software available from Bayer HealthCare LLC (Tarrytown, N.Y.). Thus, a complete tool kit may be provided to receive and store test results from the analyte meter system 538, and may receive and store other testing information such as test times and meal markers, and track test results in an electronic logbook. The tool kit may further calculate averages and provide statistical analysis of outlier test results, summarize and provide feedback on the test results, display user-friendly charts and graphs of the test results, track test results against user-specific target ranges, provide predictive analysis, and/or send data to healthcare professionals via fax, e-mail, etc.

The analyte meter system 538 may include an I/O interface element 548 that may enable a connection to another device (not shown). The other device may be selected from a variety of devices, such as desktop or laptop personal computers (PCs), hand-held or pocket personal computers (HPCs), compatible personal digital assistants (PDAs), and smart cellular phones.

The I/O interface element 548 may be any suitable Input/Output (I/O) device for allowing data communication with the processor 534 of the analyte meter system 538, such as wired and/or wireless communications. Wired communications include, for example, communications by universal serial bus (USB) connection. Wireless communications include, for example, radio-frequency (RF) links (e.g., a short-range RF telemetry), infrared (IR) links, and/or Wi-Fi. Some known RF technologies, for example, include Bluetooth® wireless technologies, Zigbee, Z-Sense™ technology, FitLinnx BodyLAN™ system. It should be understood that other communication interface technologies, or protocols, may be employed.

In operation, one by one, the colored codes 118, 120, 122 may be read by the code reader apparatus 500 as the analyte sensor 100 passes by the light-producing component 530 and the light-receiving component 532 produces signals. These signals produced may be sent to the processor 534 via signal conductor 536 (which may take the form of three or more separate conductors such as wires). Once received by the processor 534, the signals indicative of the amount of colored hues (e.g., of three colors R, G, B) in each colored code may be appropriately processed (decoded) to provide information to the processing algorithm operating within software 550 in the analyte meter system 538. Following the process of machine reading of all the colored codes 118, 120, 122, and upon full insertion of the analyte sensor 100 into the port 560 of the analyte meter system 538, an electrical contact 562 may come into electrical contact with electrodes 106, 108 (FIG. 1) of the analyte sensor 100. This enables an electrical connection to the electrodes 106, 108 so that an analyte reading to take place and an electrical signal indicative thereof to be sent to the processor 534 for calculation and display.

The machine reading may take place by any suitable colored code reader apparatus, such as the code reader apparatus 500 internally contained in an analyte meter system 538, for example, such described with reference to FIG. 5. Optionally, some embodiments may include the code reader apparatus 500 as a separate unit, which interfaces with a processing device for processing the signals from the light-receiving component 532 and an analyte measurement signal from the analyte sensor 100.

Additional embodiments of the invention are described with reference to FIGS. 6-8B wherein the use of one or more colored codes 717 may provide self coding on an analyte sensor package 700, 800. These types of sensor packages 700, 800 may include a plurality of individual analyte sensors (S) that may be packaged into a container 702, 802 such as a cartridge or disk. The sensors (S) may be received in one or more individual pockets 704, 804 arranged in the container 702, 802. For example, the pockets 704, 804 may be one or more sealed pockets adapted to seal each sensor (S). These multi-sensor systems are designed in this manner in order to reduce the amount of manual manipulation by the user. The sensor packages 700, 800 may be received in an analyte meter system 600 (FIG. 6) and include an enlarged body portion 605 for receiving the package 700, 800, a user interface 644, such as one or more buttons, a scroll wheel, etc., and a display 610, such as an LCD display adapted to display analyte readings and information to a user. The sensors (S) may be ejected from the package 700, 800 through a port as needed, for example, so that the user may apply a droplet of a bio-fluid thereto for testing.

Within each package 700, 800, individual analyte sensors (S) that may be produced from a same manufacturing lot may share the same calibration information. This coded calibration information may be placed on the actual container 702, 802 that contains the sensors (S) because the calibration information is common to each sensor (S). The color codes 717 may be positioned on the outside of the container 702, 802 in a location that may be read by a suitable multi-sensor meter system including a colored code reader apparatus as described herein. The package may be made of a foil material, and may be, for example, of the type described in U.S. Pat. Nos. 5,645,798; 5,738,244; and 5,856,195.

The one or more colored codes 717 may be positioned on either side of the container 702, and may be arranged in any suitable location and/or orientation. For example, as shown in FIG. 7B, the one or more colored codes 717 may be arranged on a non-indented back surface of the container 702 and positioned and arranged along a circumferential path at a common radius (R). Clockwise or counter-clockwise rotation of the container 702 about its center of rotation (C) may rotate each of the colored codes 717 past a suitable stationary code reader apparatus, such as the type described with reference to FIG. 5. This may facilitate the reading of the one or more colored codes 717 when the cartridge is received and rotated in a compartment of the meter system 600. This rotational reading is functionally similar to the insertion of an individual analyte sensor as described before. However, care should be taken in the design of the colored code reader apparatus to ensure that the container 702 may only be inserted into the meter system 600 in an orientation that permits the reading of the one or more colored codes 717.

Furthermore, in order to indicate that the correct sequence of codes has been read by the meter system 600, a specific color may be used for creating an index or marker that indicates the start of the color codes. For example, in FIG. 7A, a plurality of colored codes 717 are shown being arranged in a circular orientation about the package's center and on the indented front side of the container 702. The first (e.g., black) code may be a marker to signify the start of the code sequence of colored codes.

FIGS. 8A and 8B illustrate other embodiments of multi-sensor package 800 where a single color code 818 may be provided on the container 802, either on a front surface (FIG. 8A) or on a back surface (FIG. 8B) of the container 802. The package 800 may contain a plurality of sensors (S) which are received in a plurality of pockets 804, for example, which may be sealed pockets. In this example, the colored code 818 may be placed at the center of container 802 where the code may be easily read. This configuration may permit a very simple implementation of a code reader apparatus within the meter system 600 for reading the code. In addition, the package 800 would not require any motion (e.g., rotational motion) to facilitate the reading of the color codes. Furthermore, this configuration may simplify the removal and insertion of the package in the meter system 600.

In accordance with other aspects of the invention, methods of using a colored code reader system 900 according to embodiments of the invention are described. A method 900 according to an aspect of the invention provides calibration information to a processor and/or conveys other information to a user. As shown in FIG. 9, a method 900 may include, but is not limited to, providing an analyte sensor having a plurality of colored codes associated with the analyte sensor (as heretofore described) in 902, and machine reading the plurality of colored codes in 904. The machine reading in 904 may take place by any suitable colored code reader apparatus, such as the code reader apparatus 500 internally contained in an analyte meter system, for example, such as previously described with reference to FIG. 5, or as otherwise described herein.

The machine reading may include projecting a light source (e.g., a white light) onto the plurality of colored codes and receiving signals indicative of hue amounts of a red hue (R), green hue (G) and blue hue (B) contained in a colored code, or a plurality of colored codes. The hue signals may be generated by a light-receiving component (e.g., a RGB sensor), such as herein described above. The signals indicative of the amounts of colored hue may be processed in 906 to extract (decode) the coded information. Coded information may be any of the coded information (e.g., calibration constant, etc.) described above. The method 900 may calculate an analyte concentration in 908 using at least some of the decoded information, such as a calibration constant decoded from the coded information. Additional decoded information may be used in the calculation, such as the decoded units of measure information.

As shown in FIG. 10, another embodiment of a method 700 according to embodiments of the invention may include, but is not limited to, providing an analyte sensor including a plurality of colored codes associated with the analyte sensor (as heretofore described) in 1002, and machine reading the plurality of colored codes in 1004. The machine read information from the colored codes, namely, the hue amounts of [R,G,B] are then processed in step 1006 to decode the information. For example, the hue amounts may be correlated with a look-up table to decode the information, or be otherwise stored in memory. Once decoded, at least some of the information, such as instructional information, prize information, user warnings, may be conveyed to a user in 1008, such as by the use of a display or audio recording.

Figure 11:
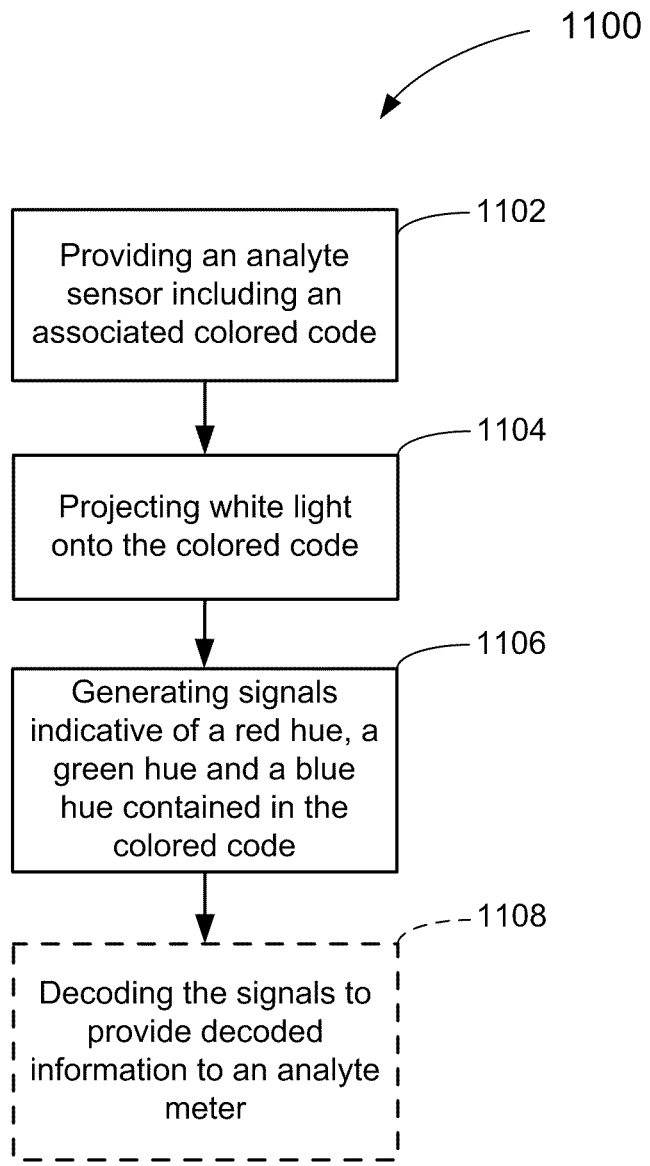
FIG. 11 is a flowchart of yet another method according to embodiments of the present invention.

FIG. 11 describes a method of operating a colored code reader apparatus described herein. The method 1100 may include, but is not limited to, providing an analyte sensor including a colored code associated with the analyte sensor (as heretofore described) in 1102. A white light is projected onto the colored code by a white light source (e.g., a white LED) in 1104. Signals are generated in 1106 which are indicative of the hue amounts of {R,G,B] contained in the colored code. An RGB sensor, as described above, may produce the signals. The signals may then be decoded in 1108 to provide decoded information (e.g., a calibration constant, units of measure, instructional information, etc.) which may be used by an analyte meter, or otherwise convey information to the user.

Figure 12:
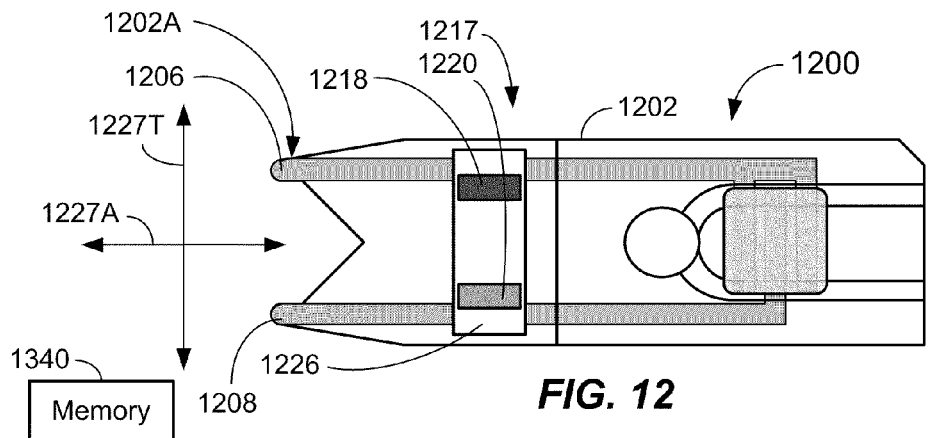
FIG. 12 is a top plan view of an exemplary embodiment of an analyte sensor provided according to the present invention.

FIG. 12 illustrates another analyte sensor containing a plurality of color codes 1217 affixed thereon. In the present illustration, the analyte sensor 1200 includes a plurality of colored codes 1218, 1220 affixed to a surface thereof. In the embodiment shown, the colored codes 1218, 1220 are provided on a label 1226, which is affixed on a surface (e.g., upper surface) of the body 1202 of the analyte sensor 1200. However, it should be understood that the colored codes 1217 may be provided on the surface of the analyte sensor 1200 or on the packaging thereof by any suitable means such as painting, spraying, rolling, transferring, etc. Moreover, the plurality of colored codes 1217 may be provided on any readable surface of the analyte sensor 1200, such as on the top, bottom, side or end surface thereof. Furthermore, although the depicted embodiment includes two colored codes, more than two, such as three, four, or more colored codes may be used if more coded information is desired to be encoded on the analyte sensor 1200.

In the depicted embodiment, the orientation of the colored codes 1218, 1220 is such that the colored codes 1218, 1200 are aligned in an approximately transverse direction across a transverse width of the analyte sensor 1200. The transverse direction is indicated by line 1227T, and is approximately perpendicular to the longitudinal axis of the analyte sensor 1200, as indicated by line 1227A. The longitudinal axis 1227A is the direction to which the analyte sensor 1200 is received into the colored code reader apparatus 1300 (See FIGS. 13A and 13B).

In the illustrated embodiment, the first end 1202A is received first into the colored code reader apparatus 1300. As soon as the analyte sensor 1200 is inserted far enough into the colored code reader apparatus 1300, electrical contact is made with the electrodes 1206, 1208. At this time, a processor (e.g., processor 1334) and control software for the colored code reader apparatus 1300 may initiate a read sequence adapted to read the colored codes 1217.

Figure 13A:
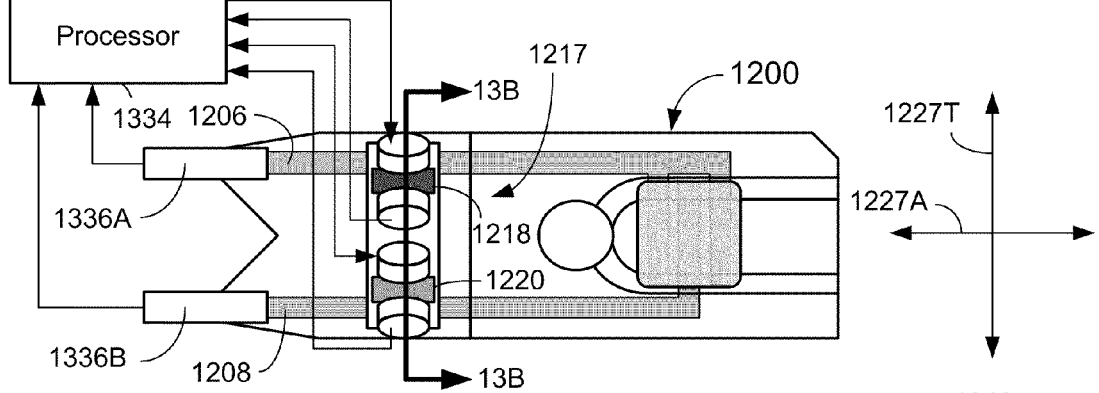
FIG. 13A is a top view of an exemplary embodiment of a colored code reading apparatus according to an aspect of the present invention.
Figure 13B:
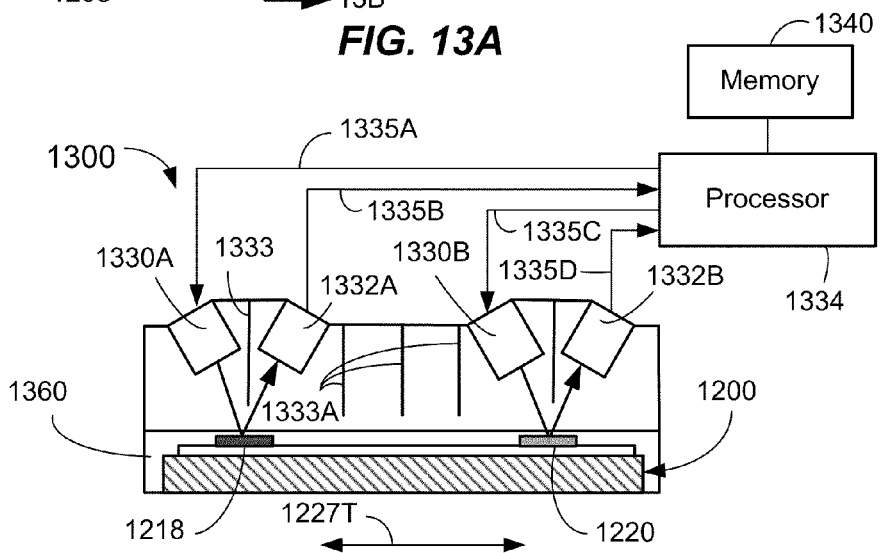
FIG. 13B is a cross sectional side view of an exemplary embodiment of a colored code reading apparatus according to an aspect of the present invention taken along line 13B-13B of FIG. 13A.

Now referring to FIGS. 13A and 13B, the colored code reader apparatus 1300, according to another aspect of the invention, is shown and described. The colored code reader apparatus 1300 includes an area (e.g., a port 1360 in a BGM) which receives the analyte sensor 1200 in a sufficiently close proximity to be able to read the plurality of colored codes 1217. Suitable walls or other alignment features of the port 1360 may function to align and constrain a position of the analyte sensor 1200 relative to the colored code reader apparatus 1300 to facilitate reading of the codes 1217.

In the depicted embodiment, two colored codes 1218, 1220 are used. The codes 1218, 1220 are oriented such that the transverse direction 1227T (i.e., transverse width of the analyte sensor 1200) is positioned across the port 1360 such that the analyte sensor 1200 is received into the port 1360 in a longitudinal direction, which is into and out of the paper in FIG. 13B. The colored code reader apparatus 1300 is oriented in this embodiment such that a first light-producing component 1330A and a second light-producing component 1330B are oriented and approximately aligned along the transverse direction 1227T. Likewise, a first light-receiving component 1332A and a second light-receiving component 1332B are oriented and approximately aligned along the transverse direction 1227T. This transverse positioning is preferred as the read sequence may be initiated as soon as the analyte sensor 1200 comes to an at-rest position in the port 1360. Additionally, when the colored codes 1217 are oriented in a transverse orientation, there is relatively larger spacing between the respective codes, which may improve discrimination effectiveness. Furthermore, this transverse configuration allows for more packaging space for the other components contained in the BGM, such as user interface, display, power components, processors (e.g., printed circuit boards), etc.

In operation, first, the control electronics of the processor 1334 determines that the analyte sensor 1200 is properly positioned in the port 1360. This may be accomplished by measuring a change in resistance as measured by electrical contacts 1336A, 1336B, which electrically engage and couple to each of the respective electrodes 1206, 1208 upon being inserted in the port 1360. If the measured resistance is below a threshold value, then it may be determined that an analyte sensor 1200 is present, and properly positioned, in the port 1360. Other forms of sensor positioning determination may be employed.

Next, the processor 1334 may initiate one or more signals in signal line 1335A to cause the light producing component 1330A to project a light towards the first colored code 1218. The light projected may be any R, G and B colored light sequence of known intensity. A light receiving component 1332A receives a portion of the light reflected from the colored code 1218. One or more signals indicative of the reflected light received may then be sent via signal line 1335B to the processor 1334. The intensity of the received light components (R, G, and B) at the light receiving component 1332A may then be recorded in memory 1340. In a like manner, the processor 1334 may initiate one or more signals in signal line 1335C to cause the light producing component 1330B to projected light towards the second colored code 1220. A light receiving component 1332B receives a portion of the light reflected from the colored code 1220. One or more signals indicative of the reflected light components (R, G, B) are sent via signal line 1335D to the processor 1334. The intensity of the received light components (R, G, and B) at the light receiving component 1332B is then recorded in memory 1340.

The sequence of signals in signal lines 1335A, 1335C of Red (R), Green (G) and blue (B) emitted light, may be provided in any order. They may even be provided simultaneously, subject only to having a sufficient number of input ports to the processor 1334. The light emitted, in this embodiment may include a plurality of colored R, G, B light signals, provided in sequence towards each colored code 1218, 1220. Light shields 1333 may be provided between the light producing and light receiving components 1330A, 1332A and 1330B, 1332B to limit an amount of received light to substantially only the reflected light. In some embodiments, one or more light shields 1333A may be included between the respective producing/receiving pairs 1330A/1332A and 1330B/1332B. Input/output processing components (not shown) may be provided in each of the signal lines, such as filters, amplifiers, A/D converters, etc. to properly condition the electrical signals to and from the processor 1334.

The light producing components 1330A, 1330B in this embodiment are adapted to produce colored light. For example, the light producing components 1330A, 1330B may be R, G and B Light Emitting Diodes (LEDs). Preferably, three-colored diodes are included in one compact device. Suitable RGB LEDs are available from Rohm Co., Ltd. of Kyoto, Japan, Kingbright Electric Corp. of Taipei, Taiwan, Sharp Microelectronics of Camas, Wash., for example. The light receiving components 1432A, 1432B may be RGB photodiodes, such as are available from Sharp Microelectronics of Camas, Wash., Panasonic-SSG of Secaucus, N.J., Silicon Laboratories Inc. of Austin, Tex., for example. The intensity of the reflected light for each of the R, G, and B emitted light of the above-mentioned sequence is obtained by the light receiving components 1332A, 1332B. These intensity values may be stored in memory 1340. The respective R, G, B intensity values for each light receiving components 1332A, 1332B may be correlated with calibration constants or other information in memory of the type discussed above.

Figure 14:
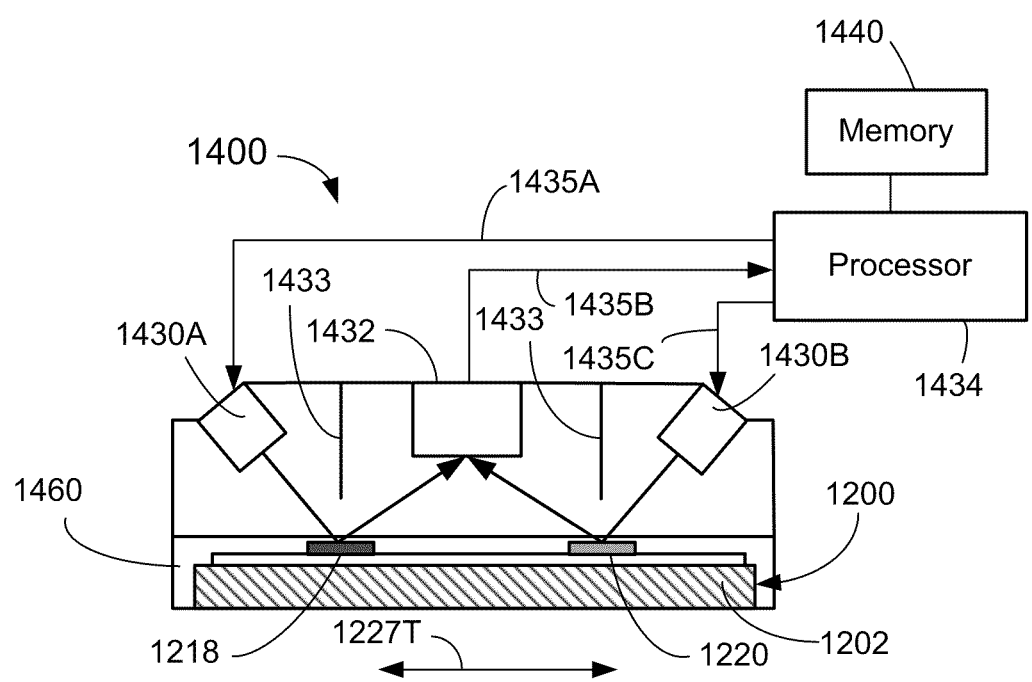
FIG. 14 is a cross sectional side view of another exemplary embodiment of a colored code reading apparatus according to an aspect of the present invention.

Now referring to FIG. 14, another embodiment of colored code reader apparatus 1400 is shown and described. This colored code reader apparatus 1400 is adapted to read only two colored codes. As before, a port 1460 in an analyte meter receives the analyte sensor 1200 and reads the plurality of colored codes 1218, 1220.

The two codes 1218, 1220 are oriented such that the transverse direction 1227T (i.e., transverse width of the analyte sensor 1200) is positioned across the port 1360 such that the analyte sensor 1200 is received into the port 1360 in a longitudinal direction (into and out of the paper in FIG. 14). Colored code reader apparatus 1400 includes a first light-producing component 1430A and a second light-producing component 1330B, which are oriented and approximately aligned along the transverse direction 1227T. In this embodiment, a common light receiving component 1432 receives the light reflected from both of the first and second light producing components 1430A, 1430B.

In operation of the embodiment of FIG. 14, the control electronics of the processor 1434 determines that the analyte sensor 1200 is properly positioned in the port 1360 as before described. Next, the processor 1434 may initiate R, G, B signals in a predetermined sequence in signal line 1435A to cause the light producing component 1430A to project R, G, and B light towards the first colored code 1218. The common light receiving component 1432 receives a portion of the light reflected from the colored code 1218. Actual R, G, B signals indicative of the reflected light received may then be sent via signal line 1435B to the processor 1434. The intensity of the received light components (R, G, and B) at the light receiving component 1432 may then be recorded in memory 1440. Likewise, the processor 1434 will initiate one or more signals in signal line 1335C to cause the light producing component 1430B to projected R, G, B light, in a predetermined sequence, towards the second colored code 1220. The common light receiving component 1432 receives a portion of the R, G, and B light reflected from the colored code 1220. R, G and B signals indicative of the reflected light components (R, G, B) are sent via signal line 1435B to the processor 1434. The intensities of the received light components (R, G, and B) at the light receiving component 1432 may then be recorded in memory 1440.

The signals in signal lines 1435A, 1435C may be provided in any order. As in the previous embodiments, light shields 1433 (e.g., light baffles) may be provided between the light producing components 1430A, 1430B and light receiving component 1432 to limit an amount of received light to substantially only the reflected light. Input/output processing components (not shown) may be provided in each of the signal lines, such as filters, amplifiers, A/D converters, etc. to properly electrically condition the signals to and from the processor 1434. The measured actual intensity values ($R_a$, $G_a$, $B_a$) may be stored in memory 1440. The respective ($R_a$, $G_a$, $B_a$) intensity values for each may then be correlated with calibration constants or other information of the type discussed above stored in a look-up table, or otherwise further processed to determine/decode a color of each of the colored codes 1218, 1220.

The light producing components 1430A, 1430B may be R, G and B Light Emitting Diodes (LEDs) as discussed above. The light receiving component 1432 may be a photodiode, as described above.

In accordance with another broad aspect of the invention, a color coded analyte sensor 1218 including a reference color is provided. The color coded analyte sensor includes a body 1202; and a plurality of machine-readable colored codes 1218, 1220 associated with the body 1202. The plurality of colored codes include a first colored code 1218 which may include a predefined hue of a first color which is a reference color, and a second colored code 1220 which may include a predefined hue of the first color, i.e., the reference color. For example, if the reference color is red (R), then the second colored code 1220 would also contain a detectable amount of red (R). For example, the second colored code 1220 may be from the orange family including some red (R) and some yellow. If the reference color is green (G), then the second colored code 1220 would also contain a detectable amount of green (G). Similarly, if the reference color is blue (B), then the second colored code 1220 would also contain a detectable amount of blue (B). Red (R) is a preferred reference color. However, in some embodiments, the reference color may also be white. If more than two codes are used, then each additional colored code may include the reference color. In some embodiments, more than one reference color may be used. For each analyte sensor 1200 to be tested in an analyte testing apparatus (e.g., a BGM), upon initialization, the read sequence first projects, in a predetermined sequence, R, G. B light onto the first colored code 1218, which is a reference code including a reference color. The first colored code may first be subjected to a red (R) light from a RGB LED at a predefined current resulting in a fixed intensity of red (R) light being projected. This may be followed by subjecting the first colored code 1218 to a fixed intensity of blue (B) light from the RGB LED, and a fixed intensity of a green (G) light from the RGB LED. In one embodiment of a normalizing method, a model of a characteristic of the colored code reader apparatus 1400, for each color used (e.g., R, G, B) may be obtained using at least one linear model of the form of:

$$R_k = b_r * R_a + c_r, \quad \text{Equation (1)}$$

$$B_k = b_b * B_a + c_b, \text{ or} \quad \text{Equation (2)}$$

$$G_k = b_g * G_a + c_g, \quad \text{Equation (3)}$$

where $R_a$, $G_a$, $B_a$ are the actual measured values obtained from the colored code reader apparatus, $R_k$, $G_k$, $B_k$ are the known values of the first colored code, i.e., the reference code, $b_r$, $b_b$, and $b_g$ are normalizing coefficients for normalizing between the actual and known values for $R_k$, $G_k$, $B_k$, and $c_r$, $c_b$, and $c_g$ are offset coefficients for known values for $R_k$, $G_k$, $B_k$.

In accordance with some embodiments, the first colored code 1218 including a reference color is read using the colored code reader apparatus 1400 by sequentially projecting R, G, B light from a light producing component 1430A, in any sequence, onto the first colored code 1218 and reading the response with a light-receiving component 1432. From this, the actual measured values of Ra, Ga, and Ba are obtained and may be recorded in memory 1440. Given the reference color is of a known hue with known values for red ($R_k$), blue ($B_k$), and green ($G_k$), the normalizing coefficients $b_r$, $b_b$, and $b_g$ may be approximated by the following equation, setting the offset coefficients $c_r$, $c_b$, and $c_g$ to zero in Equations (1)-(3) above, and solving via Equations (4), (5), and (6) below as follows:

$$b_r = R_k / R_a \quad \text{Equation (4)}$$

$$b_g = G_k / G_a \quad \text{Equation (5)}$$

$$b_b = B_k / B_a \quad \text{Equation (6)}$$

Once the normalizing coefficients $b_r$, $b_g$, and $b_b$ are determined for each color, then the colored code reader apparatus 1400 may further read the intensity values for the second colored code 1220 and any additional colored codes. Each of the actual measured intensity values of $R_a$, $G_a$, $B_a$ measured for the second colored code 1220 (and additional colored codes) may be normalized according to the normalizing method by the following relationships:

$$R_n = b_r * R_a \quad \text{Equation (7)}$$

$$G_n = b_g * G_a \quad \text{Equation (8)}$$

$$B_n = b_b * B_a \quad \text{Equation (9)}.$$

The normalized values $R_n$, $G_n$, $B_n$ values may then be recorded in memory 1440. The respective normalized values ($R_n$, $G_n$, $B_n$) may be compared to, and correlated with, predetermined range values for red (R), green (G) and blue (B) stored in a look-up table stored in memory (See Table 1 below). Associated information from the look-up table for each decoded colored code (e.g., color 1, Color 2, etc.) associated with the ranges may be extracted from the look-up table. In some embodiments, the information is a numerical value (e.g., an analyte sensor calibration constant). In other embodiments, the information is related information such as described below. The extracted information may be further used in an algorithm operating in the processor 1434 to calculate analyte values. The analyte values may also be stored in memory 1440 for later transfer, retrieval, display, or for use in further calculations. Optionally, related information may be displayed or communicated to the user such as by display on a visual display (e.g., LED or LCD screen, or the like) of an analyte meter or audibly via a speaker in or on the analyte meter.

The decoded information may include at least two selected from a group consisting of analyte sensor model, analyte sensor manufacturing facility, analyte sensor manufacturing date, analyte sensor sales territory, analyte sensor expiration date, prize winner information, inspirational information (e.g., pictures, phrases or words, colors), instructional information directed to the user, analyte sensor anti-counterfeiting information, sensor temperature dependent calibration codes, analyte meter model, and unique analyte sensor lot identifying number.

TABLE 1

| Look-up Table | | |
|---|---|---|
| Color 1 | [LL, HL]$_{R1}$, [LL, HL]$_{G1}$, [LL, HL]$_{B1}$ | Calibration Constant 1 |
| Color 2 | [LL, HL]$_{R2}$, [LL, HL]$_{G2}$, [LL, HL]$_{B2}$ | Calibration Constant 2 |
| . . . | . . . | . . . |
| Color n | [LL, HL]$_{Rn}$, [LL, HL]$_{Gn}$, [LL, HL]$_{Bn}$ | Related Information |

Figure 15:
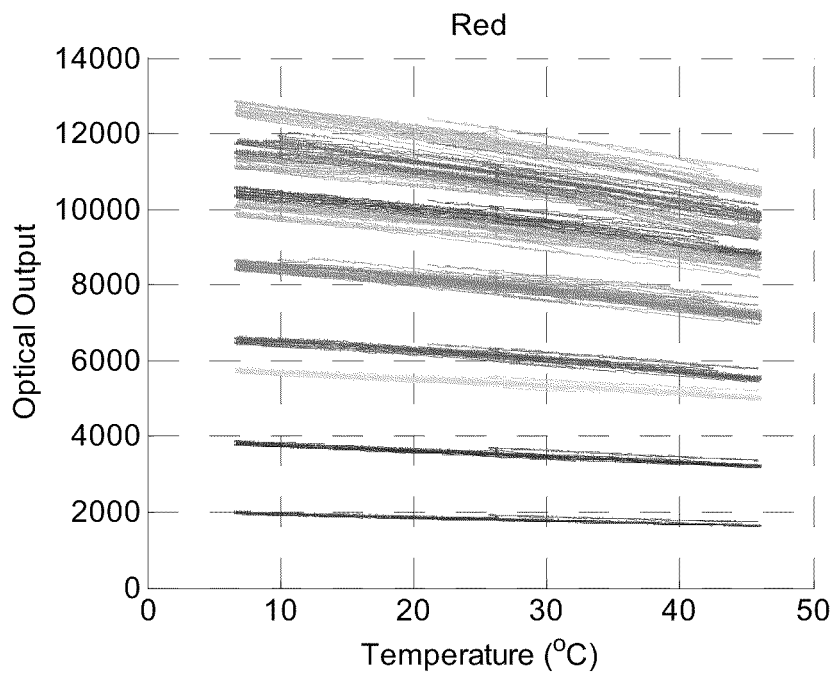
FIG. 15 is a plot of various hues of red (R) as a function optical output vs. Temperature (° C.) according to embodiments of the present invention and illustrating noise and temperature variations.
Figure 16:
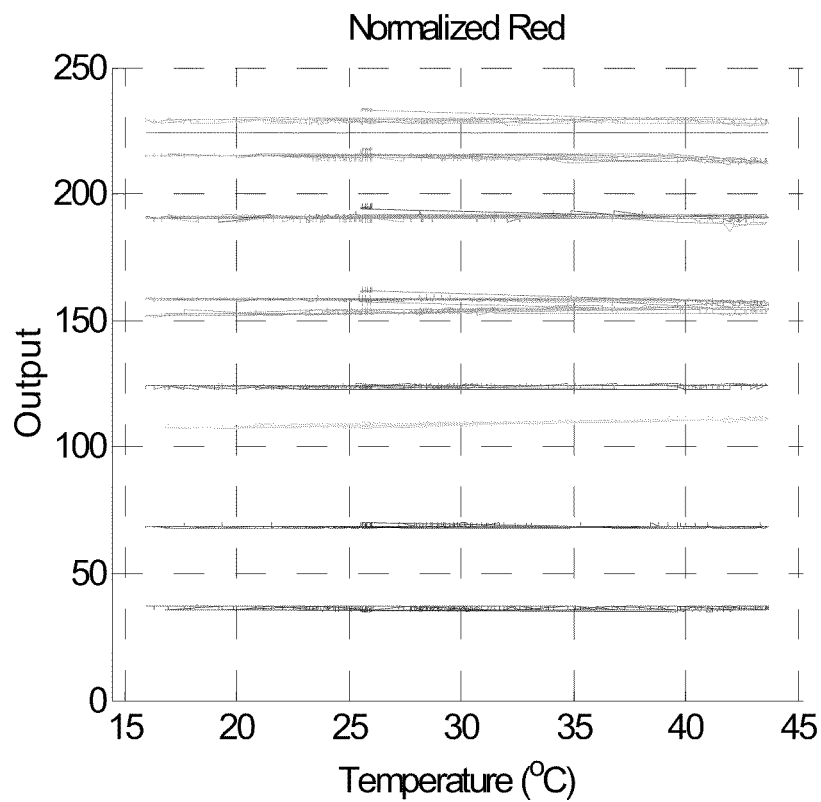
FIG. 16 is a plot of various hues of red (R) as a function optical output vs. Temperature (° C.) while including a reference color according to embodiments of the present invention.

As can be seen from FIG. 15 and FIG. 16, the use of a reference color can substantially reduce the noise associated with reading a plurality of colored codes, and thus, improve the discrimination between respective hues of a color. For example, the electronics components, such as the light receiving components and light producing components may change properties with temperature and/or age.

Utilization of a reference color in accordance with an aspect of the invention allows each of these causes of variation to be accounted for, and, thus, the noise for any particular color measurement may be lowered. Therefore, color discrimination may be improved. For example, as is shown in FIG. 15, there is a significant variation for each color detected over the environmental operating temperature range (e.g., 0° C. to about 40° C.). Additionally, there is also variation at each individual temperature (noise in the optical output level) when not using a reference color. Thus, because of the large variation in operating temperature, discrimination of color cannot be made very accurately unless temperature effects are otherwise accounted for. For example, over the range of available output levels, variation over the range from 20° C. to 40° C. may be as much as about 20%. These variations in output levels over temperature are exaggerated, especially at the higher output levels (above 6000 units measured intensity). As a result, only about 5 color hues may be accurately discriminated over the range.

In comparison, when a reference color is used, such as is shown in FIG. 16, the normalized values achieved by the above-described normalizing method are much more linear and substantially unchanging with temperature. Accordingly, it is much easier to discriminate color hues effectively. As such, a larger number of color hues, as many as 10 or more, or even 15 or more, or even 20 or more may be discriminated over the output range. This allows the use of more different hues on the second colored code and thereby the encoding of larger amounts of coded information.

In accordance with another aspect, one or more of the plurality of colored codes may be provided on the analyte sensor without the use of a reference color. In accordance with another aspect, the colored codes may be provided and/or detected using a ratiometric method. Using the ratiometric method, ratios between the respective red (R), green (G), and blue (B) values for at least one colored code are determined. In particular, the following ratios may be determined:

$$\text{ratio } 1 = R/G \qquad \text{Equation (10)}$$

$$\text{ratio } 2 = G/B \qquad \text{Equation (11)}$$

$$\text{ratio } 3 = B/R \qquad \text{Equation (12).}$$

For each color selected to be used for a colored code (e.g., a first colored code 1218 and/or a second colored code 1220), at least one of the ratios 1, 2, or 3 above should be substantially different than the other ratios for that colored code. By substantially different, what is meant is that a difference between at least two of ratios 1, 2, 3 for a colored code should be greater than about 5%, greater than about 10% or more, or even greater than about 20% or more. This ensures an accurate recognition and detection of a colored code (e.g., 1218, 1220), even without the use of a reference color. In fact, using the ratiometric method, a reference color is not needed. However, it should be recognized that the normalizing method described above may be used to increase accuracy and discrimination of the second colored code 1220.

Table 2 below illustrates Ratios 1, 2, and 3 and illustrates selected test colors which exhibit substantial differences in a ratio 1, 2, and/or 3 relative to at least one other of the ratios 1, 2, or 3.

TABLE 2

Colors With Substantial Differentiation

| Test Color | R/G Ratio 1 | G/B Ratio 2 | B/R Ratio 3 | Information |
|---|---|---|---|---|
| Yellow C | 1.11 | 2.80 | 0.32 | Calibration Constant 1 |
| Magenta C | 4.29 | 0.71 | 0.33 | Calibration Constant 2 |
| Cyan C | 0.36 | 0.66 | 4.20 | Related Information 1 |
| Purple C | 3.35 | 0.48 | 0.62 | Related Information 2 |
| Blue072C | 0.93 | 0.49 | 2.21 | Related Information 3 |

For example, Color Yellow C above includes a G/B (ratio 2) that is substantially different than either ratio 1 or ratio 3. Similarly, the ratio of R/G for Magenta C is substantially greater than the ratio of G/B (ratio 2) and B/R (ratio 3). The other examples for suitable colors for colored codes which are suitable for colored codes also include substantial differences in at least two of the ratios. It may be preferable that all three ratios be substantially different.

Figure 17:
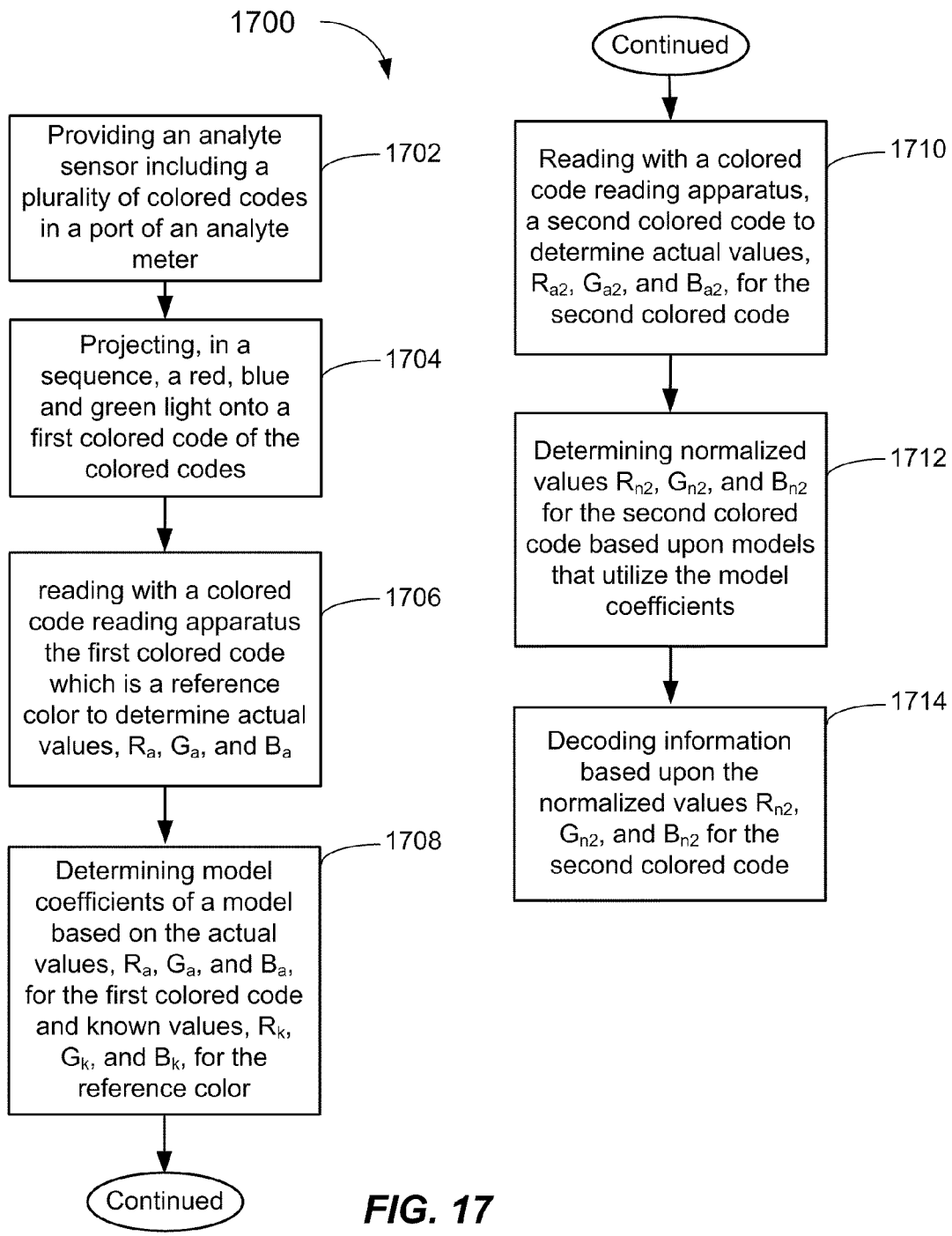
FIG. 17 is a flowchart of a normalization method according to embodiments of the present invention.

FIG. 17 illustrates a normalization method in accordance with an aspect of the invention. In this method 1700, an analyte sensor (e.g., 1200) is provided which includes two or more colored codes (e.g., 1218, 1220) affixed thereon. The analyte sensor (e.g., 1200) may be received in a port (e.g., 1360, 1460) of an analyte meter in 1702. R, G, and B light is projected, in a predetermined sequence, onto a first one of the colored codes (e.g., 1218) in 1704. In 1706, the first colored code (e.g., 1218) is read using a colored code reading apparatus (e.g., 1300, 1400) to determine actual values, $R_a$, $G_a$, and $B_a$. The first colored code (e.g., 1218) includes a reference color. In 1708, model coefficients of a model based on the actual values, $R_a$, $G_a$, and $B_a$, are determined for the first colored code (e.g., 1218) and known values, $R_k$, $G_k$, and $B_k$, for the reference color. In 1710, a colored code reading apparatus (e.g., 1300, 1400) reads a second colored code (e.g., 1220) to determine actual values, $R_{a2}$, $G_{a2}$, and $B_{a2}$, for the second colored code. Normalized values $R_{n2}$, $G_{n2}$, and $B_{n2}$ for the second colored code (e.g., 1220) are determined in 1712 based upon models that utilize the model coefficients. For example, the model may be a linear model as discussed above, or a more sophisticated model using a polynomial (which may require an additional reference color). In 1714, information is decoded based upon the normalized values $R_{n2}$, $G_{n2}$, and $B_{n2}$ for the second colored code (e.g., 1220). The decoding may be achieved by extracting from a look-up table, information stored therein when each of the normalized values $R_{n2}$, $G_{n2}$, and $B_{n2}$ fall within predefined ranges of values of $R_{n2}$, $G_{n2}$, and $B_{n2}$ in the Look-up Table. This decoded information may of the type discussed above, and may be used by an analyte meter for one or more calculations, or may be related information which is adapted to be communicated to a user of the analyte meter.

In accordance with further aspects of the invention, ratiometric methods are further shown and described with reference to FIGS. 18 and 19. In one use, the ratiometric method 1800 is a method used to select one or more colored codes to be used on an analyte sensor (e.g., 1200) to ensure proper color spacing is achieved between the respective R, G, B components of the colored code (e.g., 1218). In another aspect, as described with reference to FIG. 19, a ratiometric detection method is provided. The ratiometric detection method is used to determine and recognize a colored code, without a reference color.

The method 1800 includes providing an analyte sensor in 1802 including two or more machine-readable colored codes associated with the analyte sensor. The plurality of machine-readable colored codes are adapted to convey encoded information about the analyte sensor. The step of selecting includes, in 1804, selecting a first colored code which contains predefined values of R, G, and B such that at least one ratio from a ratio 1, a ratio 2, and a ratio 3 of the first colored code is substantially different than another of the ratio 1, ratio 2 or ratio 3 of the first colored code, wherein
ratio 1 is a ratio of R/G,
ratio 2 is a ratio of G/B, and
ratio 3 is a ratio of B/R.

Substantially different, as used herein, means that at least one of the other ratios (ratio 1, ratio 2 or ratio 3) is greater than about 5% different from each other, greater than about 10% different or more from each other, or even greater than about 20% different or more from each other. For example, ratio 1 for the first colored code may be substantially different than ratio 2 for the first colored code. All the other ratios may be either equal or different. Optionally, ratio 1 of the first colored code may be substantially different than ratio 3 for the first colored code. Finally, in some embodiments, ratio 1, 2 and 3 for the first colored code may be substantially different from one another, by each differing from one another by about 5% or more, about 10% or more, or even about 20% or more. Keeping at least two of the ratios to be substantially different, may ensure good color separation between the respective R, G, B colors of the first colored code.

In another aspect shown in FIG. 19, a ratiometric detection method 1900 adapted to detect a colored code is provided. The method 1900 may include providing an analyte sensor in 1902 having at two or more colored codes associated therewith (either on the analyte sensor or the packaging). A first colored code is detected based upon at least two ratios, or even three ratios, from a ratio 1, a ratio 2, and a ratio 3 of the first colored code,
wherein
ratio 1 is a ratio of R/G,
ratio 2 is a ratio of G/B, and
ratio 3 is a ratio of B/R.

In some embodiments, the color detection may be by any suitable colored code reader apparatus, such as a colored code reader apparatus described herein. The processor may then calculate the respective ratios 1, 2, 3 based on detected intensity values of R, G, and B (e.g., actual or normalized) for the first colored code and then compare the detected ratios to ranges of ratios (e.g., ratio 1, ratio 2 and ratio 3) stored in memory. For example, a look-up table may be searched for an entry that includes each of the ratios within pre-established ranges of ratio 1, ratio 2, and ratio 3 in the table in order to decode the color of the first colored code. Information from the look-up table which is correlated to each grouping of ratio 1, ratio 2, and ratio 3 may then be correlated to each respective detected color, and extracted when a color is decoded and used in further calculations or otherwise displayed to the user. Table 2 above illustrates how information (e.g., related information or calibration constants) may be correlated to predefined combinations of ratios 1, 2 and 3 such that information may be extracted when a color or the colored code is decoded.

The foregoing description discloses only exemplary embodiments of the invention. Modifications of the above apparatus, system and methods, which fall within the scope of the invention, will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

The invention claimed is:

1. An analyte sensor test strip, comprising:
    a body of the analyte sensor test strip including a base, the analyte sensor test strip configured to be single-use, disposable, received in and read by an analyte meter; and
    two or more machine-readable color codes printed on or adhered to the body, wherein each of said two or more machine-readable color codes are formed to include a predefined amount of a red hue, a green hue, and a blue hue,
    wherein at least one of the machine-readable color codes includes a red hue value in a range of 0 to 255, a blue hue value in a range of 0 to 255, and a green hue value in a range of 0 to 255 such that a number between 1 and 999 is configured to be generated from reading the respective hues.

2. The analyte sensor test strip of claim 1 wherein the two or more machine-readable color codes are oriented and spaced along a longitudinal length of the body.

3. The analyte sensor test strip of claim 1 wherein the two or more machine-readable color codes are oriented and spaced along a transverse width of the body.

4. The analyte sensor test strip of claim 1 wherein the two or more machine-readable color codes are:
    printed on a packaging.

5. The analyte sensor test strip of claim 1 wherein the two or more machine-readable color codes include coded information which is indicative of at least two selected from a group consisting of:
    analyte sensor model, analyte sensor calibration information, analyte sensor manufacturing facility, analyte sensor sales territory, analyte sensor expiration date, analyte sensor manufacture date, prize winner information, inspirational information, instructional information about an analyte test, analyte sensor anti-counterfeiting information, analyte sensor temperature dependent calibration codes, analyte meter model, unique analyte sensor lot identifying number.

6. The analyte sensor test strip of claim 1 wherein each of the two or more machine-readable color codes include differing widths indicative of additional coded information.

7. The analyte sensor test strip of claim 1, wherein the two or more color codes include:
    a first color code which includes a predefined hue of a first color which is a reference color, and
    a second color code which includes a predefined hue of the reference color
    wherein inclusion of the reference color in the first and second color codes enhances color discrimination capability.

8. The analyte sensor test strip of claim 1, wherein the two or more color codes include:
    a first color code which includes predefined values of R, G, and B such that at least one ratio from a ratio 1, a ratio 2, and a ratio 3 of the first color code is substantially different than another of the ratio 1, ratio 2 or ratio 3 of the first color code
    wherein
    ratio 1 is a ratio of R/G,
    ratio 2 is a ratio of G/B, and
    ratio 3 is a ratio of B/R.

9. An analyte sensor test strip package, comprising:
    a container including one or more pockets;
    one or more analyte sensor test strips sealed in the one or more pockets, each analyte sensor test strip of the one or more analyte sensor test strips including a base, the one or more analyte sensor test strips configured to be single-use, disposable, received in and read by an analyte meter; and
    a machine-readable color code provided on the container wherein the machine-readable color code includes a predefined amount of a red hue, a green hue, and a blue hue,
    wherein at least one of the machine-readable color codes includes a red hue value in a range of 0 to 255, a blue hue value in a range of 0 to 255, and a green hue value in a range of 0 to 255 such that a number between 1 and 999 is configured to be generated from reading the respective hues.

10. An analyte sensor test strip, comprising:
    a body including a base; and
    a plurality of machine-readable color codes printed on or adhered to the body,
    wherein the analyte sensor test strip is configured to be single-use, disposable, received in and read by an analyte meter,
    wherein each of the machine-readable color codes are formed to include a predefined amount of a red hue having a red hue value scalable to a first single digit value, a green hue having a green hue value scalable to a second single digit value, and a blue hue having a blue hue value scalable to a third single digit value, and
    wherein a numerical three digit value can be generated from combining the first, second, and third single digit values.

11. The analyte sensor test strip of claim 10 wherein the machine-readable color codes are oriented and spaced along a longitudinal length of the body.

12. The analyte sensor test strip of claim 10 wherein the machine-readable color codes are oriented and spaced along a transverse width of the body.

13. The analyte sensor test strip of claim 10 wherein the machine-readable color codes are printed on packaging for the analyte sensor test strip.

14. The analyte sensor test strip of claim 10 wherein the machine-readable color codes include coded information which is indicative of at least two selected from a group consisting of:

analyte sensor model, analyte sensor calibration information, analyte sensor manufacturing facility, analyte sensor sales territory, analyte sensor expiration date, analyte sensor manufacture date, prize winner information, inspirational information, instructional information about an analyte test, analyte sensor anti-counterfeiting information, analyte sensor temperature dependent calibration codes, analyte meter model, unique analyte sensor lot identifying number.

15. The analyte sensor test strip of claim 10 wherein each of the machine-readable color codes include differing widths indicative of additional coded information.

16. The analyte sensor test strip of claim 10, wherein the machine-readable color codes include:

a first color code which includes a predefined hue of a first color which is a reference color, and a second color code which includes a predefined hue of the reference color, wherein inclusion of the reference color in the first and second color codes enhances color discrimination capability.

17. The analyte sensor test strip of claim 10, wherein the machine-readable color codes include:

a first color code which includes predefined values of R, G, and B such that at least one ratio from a ratio 1, a ratio 2, and a ratio 3 of the first color code is substantially different than another of the ratio 1, ratio 2 or ratio 3 of the first color code wherein ratio 1 is a ratio of R/G, ratio 2 is a ratio of G/B, and ratio 3 is a ratio of B/R.

* * * * *